(12) United States Patent
Lam et al.

(10) Patent No.: US 12,177,329 B2
(45) Date of Patent: *Dec. 24, 2024

(54) VALIDATING CONFIDENTIAL DATA USING HOMOMORPHIC COMPUTATIONS

(71) Applicant: The Toronto-Dominion Bank, Toronto (CA)

(72) Inventors: Brian Andrew Lam, Toronto (CA); Milos Dunjic, Oakville (CA); Alexey Shpurov, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,114

(22) Filed: Jan. 13, 2023

(65) Prior Publication Data

US 2023/0155810 A1 May 18, 2023

Related U.S. Application Data

(63) Continuation of application No. 17/335,493, filed on Jun. 1, 2021, now Pat. No. 11,588,617.

(60) Provisional application No. 63/108,400, filed on Nov. 1, 2020.

(51) Int. Cl.
*H04L 9/00* (2022.01)
*G06F 7/58* (2006.01)

(52) U.S. Cl.
CPC .............. *H04L 9/008* (2013.01); *G06F 7/588* (2013.01)

(58) Field of Classification Search
CPC .................................. H04L 9/008; G06F 7/588
See application file for complete search history.

(56) References Cited

U.S. PATENT DOCUMENTS

| | | | |
|---|---|---|---|
| 8,630,422 B2 | 1/2014 | Gentry | |
| 9,100,185 B2 | 8/2015 | Yasuda | |
| 9,252,954 B2 * | 2/2016 | Halevi | ............ H04L 9/008 |
| 10,079,674 B2 | 9/2018 | Maniatakos | |
| 10,356,056 B2 * | 7/2019 | Rane | ............ H04L 9/14 |
| 10,615,960 B2 * | 4/2020 | Zhang | ............ H04L 9/0643 |
| 10,749,665 B2 * | 8/2020 | Laine | ............ H04L 9/008 |
| 10,938,547 B2 * | 3/2021 | Gajek | ............ H04L 9/008 |
| 11,200,328 B2 * | 12/2021 | Shpurov | ............ G10L 25/24 |

(Continued)

*Primary Examiner* — Viral S Lakhia
(74) *Attorney, Agent, or Firm* — Nixon Peabody LLP

(57) ABSTRACT

The disclosed exemplary embodiments include computer-implemented apparatuses and methods that validate confidential data based privacy-preserving homomorphic computations involving encrypted data. For example, an apparatus may receive, from a first computing system, encrypted data that includes a first encrypted value representative of at least one of first account data or an element of cryptographic data. Based on the first encrypted value and on second encrypted values, the apparatus may generate encrypted residual values representative of second account data associated with one or more reference accounts, and the apparatus may request and receive a decrypted residual value associated with each of the encrypted residual values from a second computing system. The apparatus may transmit the decrypted residual values to the first computing system, which may validate the first account data based on at least the decrypted residual values and perform operations associated with the validated first account data.

21 Claims, 9 Drawing Sheets

(56) References Cited

U.S. PATENT DOCUMENTS

| | | | |
|---|---|---|---|
| 11,251,936 B2* | 2/2022 | Lakshmanan | H04L 9/008 |
| 11,257,076 B2* | 2/2022 | Gulak | H04L 63/0414 |
| 11,360,743 B2* | 6/2022 | Linthicum | G06F 16/2365 |
| 11,496,304 B2* | 11/2022 | Takeuchi | H04L 9/30 |
| 11,914,738 B2* | 2/2024 | van Liesdonk | G16H 70/60 |
| 11,943,363 B2* | 3/2024 | Sheets | H04L 9/008 |
| 2019/0007197 A1 | 1/2019 | Laine | |
| 2020/0136797 A1* | 4/2020 | Yu | H04L 9/008 |
| 2020/0228309 A1* | 7/2020 | Hoffstein | G06F 17/16 |
| 2021/0042740 A1* | 2/2021 | Chen | H04L 9/008 |
| 2021/0119765 A1* | 4/2021 | Jankly | H04L 63/0428 |
| 2021/0390599 A1* | 12/2021 | Tardiou | H04L 9/3239 |
| 2022/0014351 A1* | 1/2022 | Jung | H04L 9/0894 |
| 2022/0052834 A1* | 2/2022 | Vaikuntanathan | H04L 9/008 |
| 2022/0147650 A1* | 5/2022 | Seth | G06F 21/6254 |
| 2022/0247551 A1* | 8/2022 | Joye | H04L 9/008 |

* cited by examiner

VALIDATING CONFIDENTIAL DATA USING HOMOMORPHIC COMPUTATIONS

CROSS-REFERENCE TO RELATED APPLICATION

This application is a continuation of, and claims the benefit of priority to, U.S. application Ser. No. 17/335,493, filed on Jun. 1, 2021, which claims the benefit of priority under 35 U.S.C. § 120 to U.S. Application No. 63/108,400, filed Nov. 1, 2020. The disclosures of each of these applications are expressly incorporated herein by reference to their entireties.

TECHNICAL FIELD

The disclosed embodiments generally relate to computer-implemented systems and processes that validate confidential data using homomorphic computations.

BACKGROUND

Today, financial institutions offer a variety of financial products or services to their customers. For example, financial institutions may issue, to corresponding ones of their customers, one or more accounts capable of funding, or receiving proceeds from, payment transactions initiated by or involving these customers. In some instances, and subsequent to their issuance by the financial institutions, one or more of these accounts become, or may be rendered, unavailable to fund or to receive proceeds from corresponding payment transactions.

SUMMARY

In some examples, an apparatus includes a communications interface, a memory storing instructions, and at least one processor coupled to the communications interface and the memory, the at least one processor being configured to execute the instructions to receive, via the communications interface, encrypted data from a first computing system. The encrypted data includes a first encrypted value representative of at least one of first account data or an element of cryptographic data. The at least one processor is further configured to execute the instructions to generate encrypted residual values based on the first encrypted value and on second encrypted values. The second encrypted values are representative of second account data associated with one or more reference accounts. The at least one processor is further configured to execute the instructions to, via the communications interface, request and receive a decrypted residual value associated with each of the encrypted residual values from a second computing system, and to transmit the decrypted residual values to the first computing system via the communications interface. The first computing system is further configured to validate the first account data based on at least the decrypted residual values, and to perform operations associated with the validated first account data.

In other examples, a computer-implemented includes receiving, using at least one processor, encrypted data from a first computing system. The encrypted data includes a first encrypted value representative of first account data and an element of cryptographic data. The computer-implemented also includes generating, using the at least one processor, encrypted residual values based on the first encrypted value and on second encrypted values. The second encrypted values are representative of second account data associated with one or more reference accounts. The computer-implemented also includes, using the at least one processor, requesting and receiving a decrypted residual value associated with each of the encrypted residual values from a second computing system, and transmitting, using the at least one processor, the decrypted residual values to the first computing system. The first computing system is configured to validate the first account data based on at least the decrypted residual values, and to perform operations associated with the validated first account data.

Further, in some examples, an apparatus includes a communications interface, a memory storing instructions, and at least one processor coupled to the communications interface and the memory. The at least one processor is configured to execute the instructions to transmit, via the communications interface, encrypted data to a first computing system. The encrypted data includes a first encrypted value representative of at least one of account data or an element of cryptographic data, and the first computing system is configured to generate, based on the encrypted data, encrypted residual values associated with a plurality of reference accounts and to obtain a decrypted residual value associated with each of the encrypted residual values from a second computing system. The at least one processor is further configured to execute the instructions to receive the decrypted residual values from the first computing system via the communications interface, and validate the account data based on at least the decrypted residual values, and perform operations associated with the validated account data.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
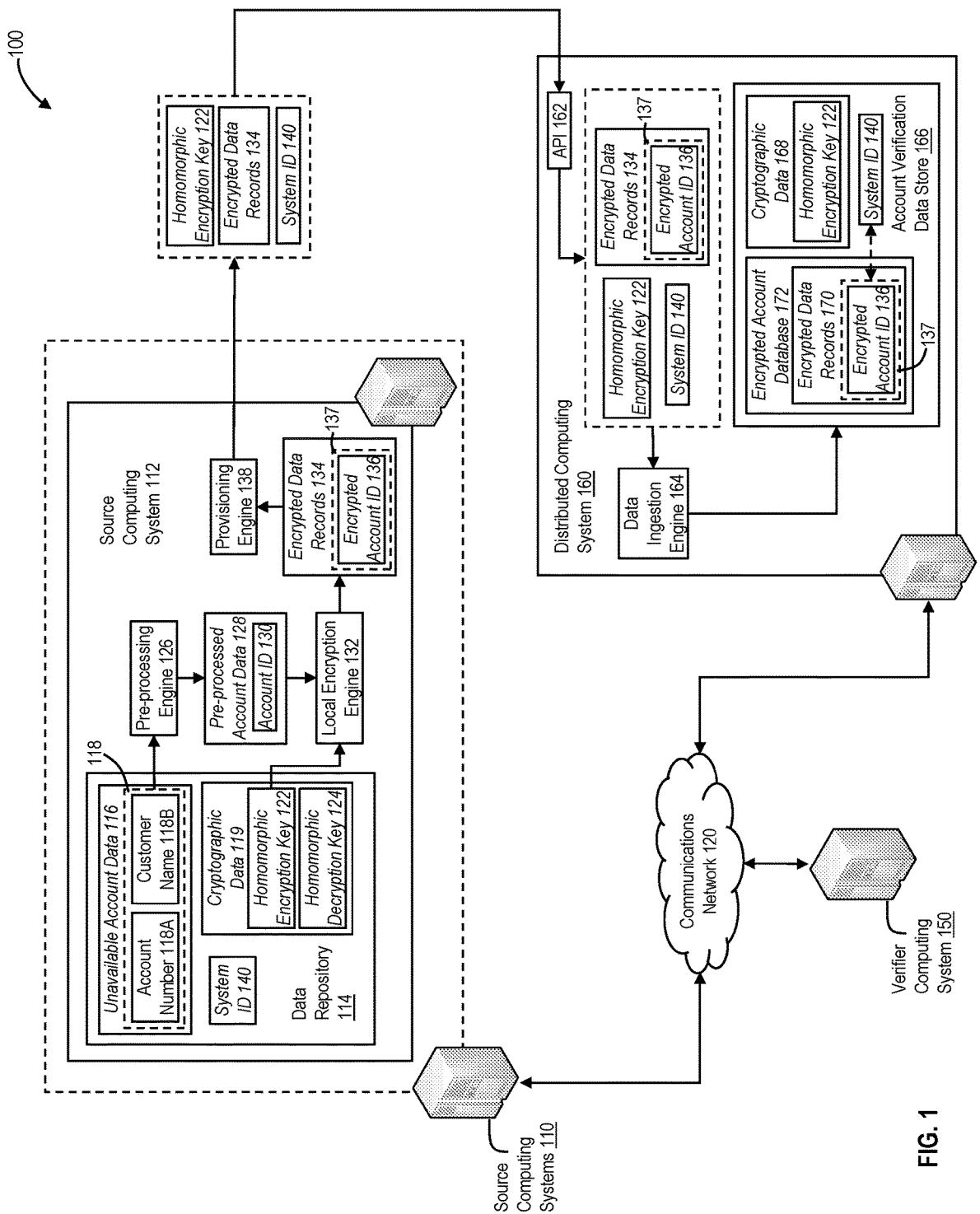
FIGS. 1, 2A, 2B, 3A, and 3B are block diagrams illustrating portions of an exemplary computing environment, in accordance with some exemplary embodiments.

Modern financial institutions offer a variety of financial products or services to their customers. For example, financial institutions may issue, to corresponding ones of their customers, one or more accounts capable of funding, or receiving proceeds from, payment transactions initiated by or involving these customers. Examples of these accounts may include, but are not limited to, a deposit account (e.g., a checking account, a savings account, etc.), a revolving line-of-credit, a credit-card account, and a brokerage or investment account. In some instances, and subsequent to their issuance by the financial institutions, one or more of these accounts become, or may be rendered, unavailable to fund or to receive proceeds from corresponding payment transactions.

For example, a financial institution may issue a checking account to a customer, and the customer may elect to provision a corresponding account number and bank routing number to an employer, e.g., to facilitate a direct deposit of wages into the newly issued deposit account via an electronic funds transfer. At a later point in time, the customer may request that the financial institution close the checking account (e.g., via an in-person branch appointment, via an available digital channel, etc.), and one or more computing systems associated with the financial institution may perform operations that close the checking account in response to the customer's request. The now-closed checking account may be unavailable to receive direct deposits of funds from the employer (e.g., via electronic transfers of funds processed by an automated clearinghouse (ACH) network), or to fund or receive proceeds from any subsequently initiated payment transaction (e.g., peer-to-peer (P2P) transactions, real-time payment (RTP) transactions, etc.).

Further, payment transactions involving one or more of the issued accounts may be deemed suspicious, and additionally, or alternatively, may not be permitted, by corresponding ones of the financial institutions, or by a corresponding governmental, regulatory, or judicial entity. For example, and based on a receipt of a request from a customer, or based on an analysis of account or transaction data maintained locally by one or more computing systems, a financial institution may determine that an account issued to the customer (e.g., a deposit account, a credit-card account, etc.) may be a target of actual or suspected fraudulent activity. In other examples, a financial institution may be subject to a judicial or governmental order to place a hold on (e.g., to "freeze") funds maintained within an account held by a customer pending a conclusion of a legal action, pending a satisfaction of an outstanding obligation (such as, but not limited to, a tax liability), or in response to a violation, by the customer, of one or more regulations or sanctions (e.g., due to account activity that violates one more imposed international sanctions, etc.). Response to the determination of the actual or suspected fraud, or to the receipt of the governmental, regulatory, or judicial order, the one or more computing systems of the financial institution may perform operations that, on a temporary or permanent basis, render the account unavailable to fund, or receive proceeds from, future payment transactions (e.g., to place a "hold" on the account to mitigate the actual or suspected fraud, etc.).

In some instances, one or more computing systems associated with a particular one of the financial institutions may generate data that identifies and characterizes one or more accounts that are issued to corresponding customers by the particular financial institution, and that are unavailable, on a temporary or permanent basis, to fund or receive proceeds from payment transactions initiated by or involving these customers. The generated data, which may collectively establish a "list" of unavailable accounts, may be stored locally by the one or more computing systems associated with, or operated by, the financial institution, and elements of the data that characterize each of the unavailable accounts may include, for example, at least a portion of a corresponding account number or a corresponding customer name. Further, in some instances, computing systems associated with, or operated by, one or more additional or alternate financial institutions, or other participants in payment processing networks (e.g., payment rails), may also perform any of the processes described herein to generate and maintain locally elements of data that identify and characterize unavailable accounts or issued previously by the other financial institutions or participants.

By way of example, and upon receipt of a request to execute a payment transaction involving an account issued to a customer by the particular financial institution, one or more computing systems associated with the particular financial institution may parse the request to obtain, among other things, account data associated with the account (e.g., an account number, etc.) or customer data associated with the corresponding customer (e.g., a customer name, etc.). The one or more computing systems may perform compare the obtained account or customer data against the locally maintained elements of data characterizing the unavailable accounts. Based on a determination that the elements of data characterizing the unavailable accounts include the obtained account data, and additionally, or alternatively, the obtained customer data, the one or more computing systems may establish, in real-time and contemporaneously with the received request, that the payment transaction involves one of the unavailable accounts and as such, represents an impermissible, or a potentially fraudulent or suspicious, payment transaction. The one or more computing systems associated with the financial institution may perform operations that decline to initiate or execute the impermissible, potentially fraudulent, or otherwise suspicious transaction.

In other examples, and based on the data requesting the execution of the transaction, the one or more computing systems may determine that the payment transaction also involves an additional, counterparty account issued by a counterparty financial institution (e.g., in addition to the account issued by the financial institution). Due data privacy and confidentiality restrictions imposed on the counterparty financial institution, the one or more computing systems may be incapable of accessing directly data identifying those accounts issued by, and deemed unavailable to participate in payment transactions, by the counterparty financial institution. Instead, and to determine whether the counterparty account issued by the counterparty financial institution is available to fund, or receive proceeds from, the requested payment transaction prior to execution, the one or more computing systems of the particular financial institution may perform operations that transmit, to a computing system of the counterparty financial institution across a corresponding payment processing network, a message that requests data characterizing the availability of the counterparty account to fund, or receive proceeds from, the requested transaction (e.g., that "ping" the computing system of the counterparty financial institution).

Although certain of these processes may facilitate a determination of the availability of the additional account using existing payment processing networks (e.g., one or more payment rails, etc.) and messaging protocols associated with these existing payment processing networks, these processes are often associated with a temporal delay between the transmission of the message and a receipt of a response to the transmitted message, and the requested data characterizing the availability of the additional account, from the computing system of the counterparty financial institution. This temporal delay may extend up to seventy-two hours after the transmission of the message, and due to the temporal delay, certain of these existing processes, when implemented across conventional payment processing networks, may be incapable of providing the financial institution with any indication of an availability of the additional account to participate in the transaction, or of the suspiciousness of that transaction, in real time and contemporaneously with the requested execution of the payment transaction involving the counterparty account.

In addition, the financial services industry continues to transition from existing payment processing networks to real-time payment (RTP) networks and corresponding RTP technologies. Although the transition to RTP networks may increase the speed at which payment transactions are initiated and executed by financial institutions, the transition may also introduce additional mechanism through which malicious actors target participants in the financial services industry, and may result in an increased volume of potentially fraudulent transactions initiated or executed via the RTP networks and payment rails. Further, many RTP networks may also be incapable of provisioning, to financial institutions and other participants, a real-time indication of an availability of an account to fund or receive proceeds from an initiated prior transaction prior to execution and without exposing elements of confidential customer or account data to unauthorized parties. The inability of many conventional payment processing networks or RTP networks to provide a real-time indication of an availability of an account often reduces an effectiveness of fraud detection and mitigation processes implemented by financial institutions and other participants in the financial services industry, and may result in an increase in the computational load of these computing systems during a performance of operations that mitigate or resolve undetected instances of fraudulent activity (e.g., through processes that resolve chargebacks, etc.).

Certain of the exemplary processes described herein, which leverage privacy-preserving homomorphic computations on encrypted data, may validate elements of sensitive customer data without exposing that sensitive, customer data to unrelated third parties and unrelated financial institutions. For instance, a computing system associated with a financial institution (e.g., a "verifier" computing system associated with a "verifier" financial institution) may receive a request to execute a payment transaction involving an account issued to a customer of the verifier financial institution and an additional account (e.g., a "counterparty account") issued by an additional financial institution (e.g., a "source" financial institution). The counterparty account may, for example, fund or receive proceeds from the payment transaction, and the verifier computing system may perform any of the exemplary processes described herein to generate a numerical account identifier representative of the counterparty account, to encrypt the numerical account identifier using a homomorphic encryption key, to generate one or more elements of encrypted verification data based on the encrypted account identifier, and to transmit a verification request that includes the one or more elements of encrypted verification data to one or more distributed components of a distributed or cloud-based computing systems, e.g., via a secure, programmatic channel of communications.

As described herein, the distributed components of the distributed or cloud-based computing system may maintain, within one or more tangible, non-transitory memories (e.g., within a portion of a distributed file system, such as an Apache Hadoop Distributed File System™ (HDFS), etc.), an array of homomorphically encrypted account identifiers representative of one or more accounts that are issued by corresponding source financial institutions and that are unavailable to fund, or receive proceeds from, initiated or executed payment transactions. In some examples, and through a performance of one or more of the exemplary, privacy-preserving homomorphic computations described herein, the distributed components of the distributed or cloud-based computing system may compute one or more encrypted residual values based on the homomorphically encrypted account identifiers representative of the unavailable accounts and on the elements of encrypted verification data included within the verification request. Further, the distributed components of the distributed or cloud-based computing system may also perform any of the exemplary processes described herein to request, and receive, a decrypted residual value associated with each of the encrypted residual values from one or more computing systems associated with the source financial institutions, and to provision the decrypted residual values to the verifier computing system in response to the verification request, e.g., in accordance with one or more cryptographic protocols, such as, but not limited to, a Secure Sockets Layer (SSL) protocol or a Transport Layer Security (TLS) protocol).

The verifier computing system may receive the decrypted residual values, and may perform any of the exemplary processes described herein to verify an availability of the counterparty account to fund, or receive proceeds from, the requested payment transaction based on the decrypted residual values. In some examples, and through a performance of privacy-preserving homomorphic computations on elements of encrypted customer and account data maintained within the distributed or cloud-based computing system, certain of the exemplary processes described herein may enable the verifier computing system to determine, in real time and contemporaneously with the receipt of the payment request, whether the counterparty account is available to fund, or to receive proceeds from, the requested payment transaction without exposing sensitive elements of customer or account data maintained by the one or more source computing systems to the verifier computing system, the distributed or cloud-based computing system, or to computing systems associated with other unrelated third parties.

Certain of these exemplary processes, which enable a computing system of a financial institution to confirm an availability of an account issued by a counterparty financial institution to fund, or receive proceeds from, a requested payment transaction without accessing directly any sensitive elements of customer or account data maintained by the counterparty financial institution, and without exposing the sensitive elements of customer or account data to unauthorized parties, and may be implemented in addition to, or as an alternate to, fraud mitigation processes that rely on private, internally maintained, institution-specific databases or data stores characterizing unavailable accounts. Further, and through an implementation of parallelized, fault-tolerant distributed computing and analytical protocols described herein across clusters of central processing units (CPUs), graphical processing units (GPUs) and/or tensor processing units (TPUs) maintained by the distributed or cloud-based computing system, certain of these exemplary processes may reduce a computational time, and increase a computational efficiency, of the homomorphic computations described herein when compared to serial implementation using a corresponding computing system and CPU.

a. Exemplary Processes for Validating Elements of Confidential Data Using Privacy-Preserving Homomorphic Computations on Encrypted Data FIG. 1 illustrates components of an exemplary computing environment 100, in accordance with some exemplary embodiments. For example, as illustrated in FIG. 1A, environment 100 may include a plurality of source computing systems 110, such as, but not limited to, source computing system 112, a verifier computing system 150, and a distributed or cloud-based computing system, such as, but not limited to, distributed computing system 160. In some instances, each of source computing systems 110 (including source computing system 112), verifier computing system 150, and distributed computing system 160 may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source computing systems 110 (including source computing system 112), verifier computing system 150, distributed computing system 160, and additional, or alternate, computing systems operating within environment 100 may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operations) in a single clock cycle. Further, each of source computing systems 110 (including source computing system 112), verifier computing system 150, distributed computing system 160, and the additional, or alternate, computing systems operating within environment 100 may also include a communications interface, such as one or more wireless transceivers, coupled to the one or more processors for accommodating wired or wireless internet communication with other computing systems and devices operating within environment 100.

As described herein, each of source computing systems 110 may be associated with, or operated by, a corresponding financial institution, e.g., a corresponding "source" financial institution, and verifier system 150 may also be associated with, or operated by, a corresponding financial institution, e.g., a corresponding "verifier" financial institution. The verifier financial institution may, for example, represent one of the source financial institutions, although in other instances, the verifier financial institution may represent a financial institution that is distinct from, and unrelated to, any of the source financial institutions. In some instances, one or more of source computing systems 110 (including source computing system 112) and verifier computing system 150 may be incorporated into a respective, discrete computing system. In additional, or alternate, instances, one or more of source computing systems 110 and verifier computing system 150 may correspond to a distributed or cloud-based computing system having multiple computing components distributed across an appropriate computing network, such as communications network 120 of FIG. 1. For example, when implemented as a distributed or cloud-based computing system, one or more of source computing systems 110, such as source computing system 112, and verifier computing system 150 may include corresponding, distributed computing components associated with respective ones of the source and verifier financial institutions.

Distributed computing system 160 may also include multiple computing components distributed across an appropriate computing network, such as communications network 120 of FIG. 1. For example, distributed computing system 160 may correspond to a private distributed or cloud-based computing cluster that is associated with the source and verifier financial institutions described herein (e.g., a consortium that includes the source and verifier financial institutions acting collectively), and that is accessible to each of source computing systems 110 and verifier computing system 150 via a corresponding programmatic interface, such as an application programming interface (API). Additionally, or alternatively, distributed computing system 160 may correspond to a publicly accessible, distributed or cloud-based computing cluster, such as a computing cluster maintained by Microsoft Azure™, Amazon Web Services™, Google Cloud™, or another third-party provider unrelated to the source and verifier financial institutions.

In some instances, the distributed computing components of one or more of source computing systems 110 (e.g., source computing system 112), verifier computing system 150, and additionally, or alternatively, distributed computing system 160 may be configured to implement one or more parallelized, fault-tolerant distributed computing and analytical processes, such as processes provisioned by the Apache Spark™ distributed, cluster-computing framework or the Databricks™ analytical platform. Further, and in addition to the CPUs described herein, the distributed computing components of one or more of source computing systems 110, verifier computing system 150, and/or distributed computing system 160 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Each of source computing systems 110 may maintain, within corresponding tangible, non-transitory memories, a data repository that include elements of data identifying and characterizing one or more accounts that are issued by a respective one of the source financial institutions to customers, and further, that are unavailable to fund, or to proceeds from, payment transactions requested by or involving corresponding ones of the customers, e.g., on a temporary or permanent basis. Examples of the unavailable accounts include, but are not limited to, a deposit account (e.g., a savings account, a checking account, etc.), a credit-card account, a secured or unsecured line-of-credit, a brokerage account, or an additional financial product issued by corresponding ones of the source financial institution, and as described herein, the unavailable accounts may include, but are not limited to, an account closed or placed on hold by corresponding ones of the customer, an account associated with an actual or suspected instance of fraudulent or malicious activity, an account subject to a judicial, governmental, or regulatory order (e.g., a "frozen" account), or an account associated with one or more impermissible or sanctioned activities.

By way of example, and as illustrated in FIG. 1, source computing system 112 may maintain, within the one or more tangible, non-transitory memories, a data repository 114 that includes elements of unavailable account data 116. As described herein, each of the elements of unavailable account data 116 identify, and characterize, a corresponding account that is issued to a customer by the source financial institution associated with source computing system 112, and that is unavailable (e.g., on a permanent or temporary basis) to fund, or receive proceeds from, payment transactions requested by or involving that customer. Further, each of the elements of unavailable account data 116 may include information that identifies the corresponding unavailable account (e.g., all, or a selected portion, of an actual or tokenized account number, etc.) and that identifies and characterizes the customer that holds the corresponding unavailable account.

For instance, the unavailable accounts issued by the source financial institution associated with source computing system 112 may include a checking account issued to a corresponding one of the customers, and the unavailable checking account may be associated with an element 118 of unavailable account data 116. As illustrated in FIG. 1A, element 118 may include, among other things, an account number 118A of the unavailable checking account (e.g., "6789-5432-5678-1234") and a customer name 118B of the customer that holds the unavailable checking account (e.g., "John Q. Stone"). The disclosed embodiments are, however, not limited to these exemplary account or customer identifiers, and in other instances, element 118 may include any additional, or alternate, account information that identifies the unavailable account or the customer that holds the unavailable checking account, or any other information associated with the unavailable checking account, such as, but not limited, to information characterizing a temporary or permanent status of the unavailable checking account, a date upon which the source financial institution deemed the checking account unavailable, or an underlying cause associated with the unavailable status of the checking account (e.g., a closure by the customer, potential or actual fraud, an order from a judicial, regulatory, or governmental entity, impermissible or sanctioned activity, etc.). Further, although not illustrated in FIG. 1A, unavailable account data 116 may include additional elements of data that identify and characterize each additional, or alternate, unavailable account issued by the source financial institution associated with source computing system 112 and a corresponding customer that holds each of the additional, or alternate, unavailable accounts, such as, but not limited to, the exemplary account numbers and customer names described herein.

Source computing system 112 may also maintain, within data repository 114, elements of cryptographic data 119 that facilitate a selective encryption of all, or a selected portion of, each element of unavailable account data 116 in accordance with a corresponding homomorphic encryption scheme. For example, as illustrated in FIG. 1A, cryptographic data 119 may include, but is not limited to, homomorphic encryption key 122 and a homomorphic decryption key 124. In some instances, homomorphic encryption key 122 may include a public homomorphic key, which may be broadcasted to distributed computing system 160, and which may be accessible to verifier computing system 150 through a corresponding programmatic interface, using any of the exemplary processes described herein. Further, homomorphic decryption key 124 may correspond to a private homomorphic key associated with source computing systems 110 and further, with each of the source financial institutions associated with, or that operate, source computing systems 110. In some examples, each of source computing systems 110, including source computing system 112, may maintain homomorphic decryption key 124 (and in some instances, homomorphic encryption key 122) within a secure portion of a corresponding data repository, e.g., data repository 114.

In some instance, one or more of source computing systems 110, such as source computing system 112, may generate each of homomorphic encryption key 122 and homomorphic decryption key 124, and may perform operations that provision, or broadcast, homomorphic encryption key 122 and homomorphic decryption key 124 to each of the additional, or alternate, ones of source computing systems 110. In other instances, each of source computing systems 110, including source computing system 112, may perform operations locally to generate, and to store, corresponding ones of homomorphic encryption key 122 and homomorphic decryption key 124 in accordance with the corresponding homomorphic encryption scheme. By way of example, the corresponding homomorphic encryption scheme may include, but is not limited to, a fully homomorphic encryption scheme facilitating arbitrary computations on ciphertext and generating encrypted results that, when decrypted, match the results of the arbitrary computations performed on corresponding elements of plaintext. Examples of these fully homomorphic encryption schemes include, but are not limited to, a TFHE encryption scheme that facilitates verifiable computations on integer ciphertext and a SEAL encryption scheme or a PALISADE encryption scheme that facilitates verifiable computations on floating-point ciphertext.

Referring back to FIG. 1A, a pre-processing engine 126 executed by the one or more processors of source computing system 112 may perform operations that access data repository 114 and obtain each of the elements of unavailable account data 116. Executed pre-processing engine 126 may parse each of the elements of unavailable account data 116, obtain the account information associated with corresponding unavailable account (e.g., all, or a selected portion, of an actual or tokenized account number, etc.) and the profile information that identifies and characterizes the customer that holds the corresponding unavailable account, and generate a numerical account identifier for the corresponding unavailable account based on the account and profile information. In some instances, each of numerical account identifiers may include a numerical character string of predetermined length, which may be extracted from the account information associated with the corresponding unavailable account, or which may be derived from one or more portions of the account or profile information associated with the corresponding unavailable account (e.g., as obtained from the corresponding element of unavailable account data 116). Further, executed pre-processing engine 126 may perform operations that package each of the generated, numerical account identifiers into a corresponding portion of pre-processed account data 128.

By way of example, executed pre-processing engine 126 may parse element 118 of unavailable account data 116, and may perform operations that obtain account number 118A of the unavailable checking account and customer name 118B of the customer that holds the unavailable checking account (e.g., "John Q. Stone"). In some instances, executed pre-processing engine 126 may generate a numerical account identifier 130 for the unavailable checking account that includes account number 118A (the sixteen-digit account number (e.g., "6789-5432-5678-1234"), or alternatively, a portion of account number 118A having a predetermined length (e.g., a predetermined subset of the sixteen-digit account number). In other instances, executed pre-processing engine 126 may perform operations that input all, or a portion of, account number 118A into a corresponding hash function, and that establish the resulting hash value (e.g., the numerical character string of predetermined length) as numerical account identifier 130, which executed pre-processing engine 126 may package into a corresponding portion of pre-processed account data 128.

Further, in some instances, executed pre-processing engine 126 may perform operations that generate numerical account identifier 130 based on all, or a selected portion, of profile information associated with the unavailable checking account. For example, executed pre-processing engine 126 may perform operations that obtain the customer's full name (e.g., "John Q. Stone") from customer name 118B, and that generate a character string based on a concatenation of the customer's first and last names, e.g., "JohnStone." Executed pre-processing engine 126 may perform operations that input the concatenation of the customer's first and last name into a corresponding hash function, and that establish resulting hash value (e.g., the numerical character string of predetermined length) as numerical account identifier 130 for the unavailable checking account. Additionally, or alternatively, executed pre-processing engine 126 may perform operations that generate a character string based on a concatenation of a portion of account number 118A and a portion of customer name 118B (e.g., "678954John," etc.), that input the concatenation of the portions of account number 118A and customer name 118B into a corresponding hash function, and that establish resulting hash value as numerical account identifier 130 for the unavailable checking account.

The disclosed embodiments are, however, not limited to these exemplary numerical strings representative of portions of account number 118A and/or customer name 118B, and in other instances, executed pre-processing engine 126 may perform any of the operations described herein to generate numerical account identifier 130 based on any additional, or alternate, portion of the account information or profile information associated with the corresponding unavailable account. Further, executed pre-processing engine 126 may also perform any of the exemplary processes described herein to generate a numerical account identifier for each additional, or alternate, one of the unavailable accounts based corresponding account and profile information obtained from a corresponding one of the elements of unavailable account data 116, and to package the pre-processed account identifier for each additional, or alternate, one of the unavailable accounts into a corresponding portion of pre-processed account data 128.

Referring back to FIG. 1, executed pre-processing engine 126 may provision pre-processed account data 128, including numerical account identifier 130, as an input to a local encryption engine 132 executed by the one or more processors of source computing system 112. Executed local encryption engine 132 may receive pre-processed account data 128, and may perform operations that obtain homomorphic encryption key 122 from one or more of the tangible, non-transitory memories of source computing system 112, e.g., from cryptographic data 119 maintained within data repository 114. Executed local encryption engine 132 may also perform operations that encrypt each of the numerical account identifiers maintained within pre-processed account data 128 using homomorphic encryption key 122, and package each of the encrypted account identifiers into a corresponding data record of encrypted data records 134.

For example, as illustrated in FIG. 1, executed local encryption engine 132 may access numerical account identifier 130 of pre-processed account data 128 (e.g., representative of the unavailable checking account issued by the source financial institution associated with source computing system 112), and may perform operations that encrypt numerical account identifier 130 using homomorphic encryption key 122, and package a corresponding encrypted account identifier 136 within a data record 137 of encrypted data records 134. Executed local encryption engine 132 may also perform any of these exemplary processes to access each additional, or alternate, pre-processed account identifier within pre-processed account data 128, to encrypt each of the additional, or alternate, pre-processed account identifiers using homomorphic encryption key 122, to package the additional, or alternate, homomorphically encrypted account identifiers into corresponding ones of the data records of encrypted data records 134.

As described herein, source computing system 112 may be implemented as distributed computing system that includes computing components distributed across a corresponding communications network, such as network 120 of FIG. 1. In some instances, the distributed components of source computing system 112 may execute local encryption engine 132, and may perform parallel processing to homomorphically encrypt the each of the numerical account identifiers within pre-processed account data 128 based on an application of a distributed, homomorphic encryption function consistent with the corresponding homomorphic encryption to the pre-processed account identifiers. The parallel implementation of local encryption engine 132 by the distributed components of source computing system 112 may, in some instances, be based on an implementation, across the distributed components, of one or more of the parallelized, fault-tolerant distributed computing and analytical protocols described herein (e.g., the Apache Spark™ distributed, cluster-computing framework, etc.). Certain of these exemplary processes, which integrate a fully homomorphic encryption scheme into a parallelized, fault-tolerant distributed computing and analytical protocol, may enable the distributed components of source computing system 112 (e.g., including one or more of the CPUs, GPUs, or TPUs described herein) to accelerate the homomorphic encryption of the elements of the pre-processed account identifiers via an efficient parallelization across the distributed components, e.g., when compared to a serial implementation via a single CPU.

As illustrated in FIG. 1, executed local encryption engine 132 may provide encrypted data records 134 as an input to a provisioning engine 138 executed by the one or more processors of source computing system 112. In some instances, executed provisioning engine 138 may obtain, from data repository 114, homomorphic encryption key 122 (e.g., as maintained within cryptographic data 119) and a system identifier 140 of source computing system 112. Examples of system identifier 140 may include, but not limited to, an Internet Protocol (IP) address or a Media Access Control (MAC) of source computing system 112. Further, executed provisioning engine 138 may perform operations that cause source computing system 112 to broadcast homomorphic encryption key 122, encrypted data records 134, and system identifier 140 across network 120 to distributed computing system 160.

A programmatic interface established or maintained by distributed computing system 160, such as application programming interface (API) 162, may receive homomorphic encryption key 122, encrypted data records 134, and system identifier 140 from source computing system 112, and may route homomorphic encryption key 122, encrypted data records 134, and system identifier 140 to a data ingestion engine 164 executed by distributed computing system 160. In some examples, illustrated in FIG. 1, executed data ingestion engine 164 may perform operations that store homomorphic encryption key 122 within a portion of an account verification data store 166 established and maintained by the distributed components of distributed computing system 160 (e.g., as a portion of cryptographic data 168). Executed data ingestion engine 164 may also perform operations that store all, or selected subset, of encrypted data records 134 within an additional portion of account verification data store 166 (e.g., within encrypted data records 170 of encrypted account database 172). Further, and by way of example, executed data ingestion engine 164 may also store system identifier 140 within a portion of account verification data store 166, and may perform operations that associate, or link together, each of encrypted data records 170 with system identifier 140. In some instances, by associating or linking together encrypted data records 170 and system identifier 140, executed data ingestion engine 164 may establish an association between encrypted data records 170 and source computing system 112.

For example, account verification data store 166 may correspond to a data lake, a data warehouse, or another centralized repository established and maintained, by the distributed components of distributed computing system 160 (e.g., through a HDFS, as described herein), and the distributed components of distributed computing system 160 may include one or more CPUs, GPUs, or TPUs configured to operate as a discrete cluster implementing one or more parallelized, fault-tolerant distributed computing and analytical processes, such as those described herein (e.g., the Databricks™ analytical platform, etc.). In some instances, the distributed components of distributed computing system 160 may execute data ingestion engine 164 and perform any of the exemplary processes described herein in parallel to: ingest homomorphic encryption key 122 into cryptographic data 168 of account verification data store 166; to ingest each of encrypted data records 134, which include a corresponding, homomorphically encrypted account identifier into corresponding portions of encrypted account database 172 (e.g., as encrypted data records 170); and further, to ingest system identifier 140 into a corresponding portion of account verification data store 166, and to perform operations that associate, or link together, each of encrypted data records 170 and system identifier 140 within account verification data store 166.

In further examples (not illustrated in FIG. 1), encrypted data records 170 may include additional encrypted data records provisioned to distributed computing system 160 by source computing system 112, and ingested into account verification data store 166, during one or more prior temporal intervals. For examples, each of the additional encrypted data records may include a homomorphically encrypted account identifier that identifies an additional, or alternate, account issued by the source financial institution associated with source computing system 112. In some instances, and prior to an ingestion of encrypted data records 134 into account verification data store 166, executed data ingestion engine 164 may perform one or more synchronization processes (such as, but not limited to, a "delta" synchronization process) involving encrypted data records 134 (e.g., as received by distributed computing system 160 during a current temporal interval) and the additional encrypted data records (e.g., as previously ingested into account verification data store 166 during one or more prior intervals).

During an performance of the one or more synchronization processes, executed data ingestion engine 164 may decompose the encrypted data records 134 into: (i) a first subset of data records that were ingested previously into account verification data store 166 and as such, represent duplicates of the additional encrypted data records; and (ii) a second subset of data records that are distinct from the additional encrypted data records and as such, that await ingestion into account verification data store 166. For example, and for data record 137 of encrypted data records 134, executed data ingestion engine 164 may access encrypted account identifier 136 (e.g., that represents a corresponding unavailable account issued by the source financial institution system associated with source computing system 112), and the determine whether the any of the additional encrypted data records include encrypted account identifier 136.

If executed data ingestion engine 164 were to establish that none of the additional encrypted data records (e.g., as previously ingested into account verification data store 166) include encrypted account identifier 136, executed data ingestion engine 164 may determine that data record 137 of encrypted data records 134 awaits ingestion into account verification data store 166, and may assign data record 137 (and encrypted account identifier 136) to the second subset described herein. Executed data ingestion engine 164 may also perform any of the exemplary processes described herein to that store data record 137 within a corresponding portion of encrypted data records 170, and to associate together data record 137 (and homomorphically encrypted account identifier 136) and system identifier 140 within account verification data store 166.

Alternatively, if executed data ingestion engine 164 were to establish that at least one of the additional encrypted data records includes encrypted account identifier 136, executed data ingestion engine 164 may establish that data record 137 represents a duplicate of the least one of the additional encrypted data records and as such, was ingested previously into account verification data store 166. Based on the determination that the data record 137 represents a duplicate of the least one of the additional encrypted data records, executed data ingestion engine 164 may perform operations that discard data record 137. Executed data ingestion engine 164 may also perform any of the exemplary processes described herein to synchronize each of the additional, or alternate, one of encrypted data records 134 against each of the additional encrypted data records ingested previously into, and maintained within, account verification data store 166.

Further, although not illustrated in FIG. 1, each additional, or alternate, one of source computing systems 110 may be associated with a corresponding source financial institution, and each additional, or alternate, one of source computing systems 110 may perform any of the exemplary processes described herein to generate pre-processed account identifiers representative of unavailable accounts issued by the corresponding source financial institution, to encrypt homomorphically each of the pre-processed account identifiers using a corresponding homomorphic encryption key (e.g., homomorphic encryption key 122), and to broadcast the corresponding homomorphic encryption key, the corresponding encrypted data records that include the encrypted account identifiers, and a corresponding system identifier (e.g., an IP or MAC address, as described herein) across network 120 to distributed computing system 160. In some instances, also not illustrated in FIG. 1, distributed computing system 160 may receive the corresponding homomorphic encryption key, the corresponding encrypted data records, and the corresponding system identifier from each of the additional, or alternate, ones of source computing systems 110 (e.g., via API 162), and may perform any of the exemplary processes described herein to store the corresponding homomorphic encryption keys within a portion of account verification data store 166 (e.g., within an additional portion of cryptographic data 170), to ingest all, or a subset, of the corresponding encrypted data records received from each of the additional, or alternate, ones of source computing systems 110 into additional portions of account verification data store 166 (e.g., within an additional portion of encrypted account database 172), and further, to ingest the corresponding system identifiers into portions of account verification data store 166.

Through a performance of one or more of the exemplary processes described herein, distributed computing system 160 may establish and maintain, within account verification data store 166, and array of homomorphically encrypted account identifiers (e.g., $E(A_{U})$) representative of a plurality of accounts that are issued by the source financial institutions associated with source computing systems 110, and that unavailable to fund, or receive proceeds from, payment transactions involving, or initiated by, corresponding counterparties, such as, but not limited to, a customer of the verifier financial institution associated with verifier computing system 150. Further, certain of the exemplary processes described herein, which leverage privacy-preserving homomorphic computations on the array of homomorphically encrypted account identifiers maintained at distributed computing system 160, may enable a computing system, such as verifier computing system 150, to verify an availability of an account issued by a corresponding one of the source financial institutions to fund, or receive proceeds from, a payment transaction without accessing elements of sensitive customer and account data maintained by the corresponding source financial institution, or without exposing the elements of sensitive customer and account data to unrelated third parties and unrelated financial institutions.

For example, a customer of a financial institution, e.g., the verifying financial institution associated with verifier computing system 150, may elect to initiate a payment transaction involving a corresponding counterparty, such as, but not limited to, a customer of one of the source financial institutions described herein. The initiated payment transaction may, in some instances, include an electronic transfer of funds from a customer account issued by the verifier financial institution to a counterparty account issued by the corresponding source financial institution (e.g., the counterparty account receives proceeds from the initiated payment transaction), or alternatively, the initiated payment transaction may include an electronic transfer of funds from the counterparty account to the customer account (e.g., the counterparty account funds the initiated payment transactions). As described herein, the initiated payment transaction may, for example, be associated with an electronic transfer of funds processed by an automated clearinghouse (ACH) network (e.g., a direct deposits of funds into the counterparty account) or by a real-time payment (RTP) network, and may be initiated in response to one or more purchase transactions involving the customer and the corresponding counterparty, or one or more peer-to-peer (P2P) transactions involving the customer and corresponding counterparty.

Figure 2A:
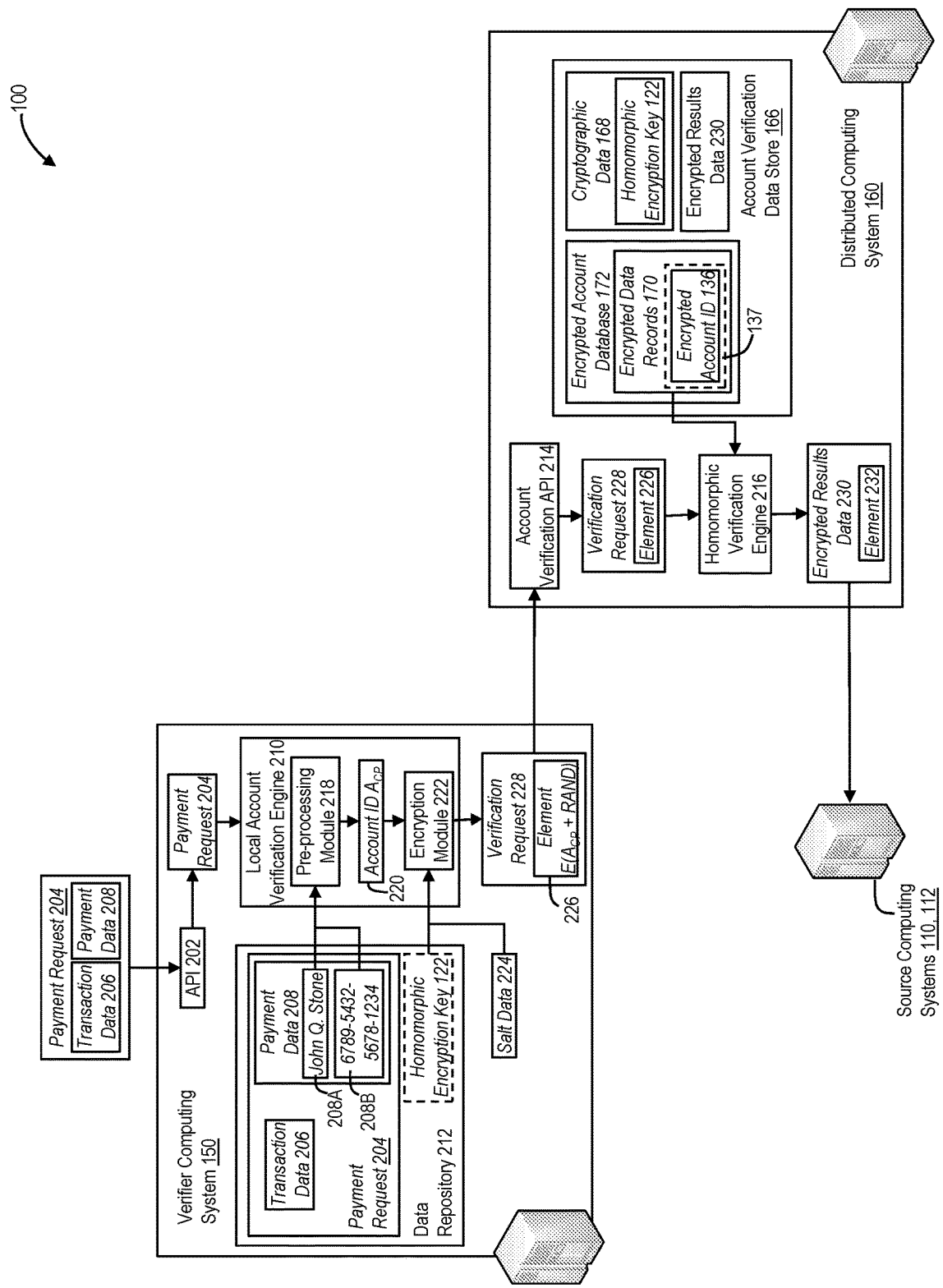

Referring to FIG. 2A, a programmatic interface established and maintained by verifier computing system 150, such as application programming interface (API) 202, may receive, across network 120, a payment request 204 that requests an execution of the initiated payment transaction involving the customer of the verifier financial institution and the corresponding counterparty. By way of example, the customer of the verifier financial institution may agree to purchase tickets to an upcoming hockey playoff game from the corresponding counterparty, and may request, via payment request 204, an initiation of a payment transaction that transfers funds in the amount of $250 on Jun. 30, 2021, from a customer account issued by the verifier financial institution to a counterparty account issued by one of the source financial institutions associated with source computing systems, such as, but not limited to, the source financial institution associated with source computing system 112.

In some instances, payment request 204 may be generated by an application program (e.g., a mobile banking application associated with the verifier financial institution) executed by a device operated by the customer (e.g., based on input provided by the customer to a corresponding digital interface associated with the executed mobile banking application), and verifier computing system 150 may receive payment request 204 from the customer device via API 202. In other instances, verifier computing system 150 may receive, payment request 204 via API 202 from one or more computing systems of the ACH network, the RTP network, or other payment-processing network, such as, but not limited to, a clearinghouse system. The disclosed embodiments are not limited to elements of request data generated by these exemplary customer devices or computing systems, and in other instances, verifier computing system 150 may receive payment request 204 from any additional, or alternate, computing device or computing system associated with the initiated payment transaction, the customer of the verifier financial institution, or the corresponding counterparty, such as one of source computing systems 110 associated with the corresponding source financial institution.

As illustrated in FIG. 2A, payment request 204 may include, but is not limited to, elements of transaction data 206 and payment data 208 that collectively identify and characterize the initiated payment transaction, the customer and the corresponding counterparty, and the customer and counterparty accounts. For example, transaction data 206 may include values of one or more parameters that characterize the initiated payment transaction, such as, but not limited to, the requested payment amount of $250 and the requested payment date of Jun. 30, 2021. Further, payment data 208 may include one or more identifiers of the customer and corresponding, such as, but not limited to, a customer name and a counterparty name, and one or more identifiers of the customer and counterparty accounts, such as, but not limited to, a customer account number and a counterparty account number. The disclosed embodiments are, however, not limited to these exemplary identifiers of the customer and the corresponding counterparty, and of the customer and counterparty accounts, and in other instances, payment data 208 may include any additional, or alternate, information that would enable verifier computing system 150 to execute the initiated payment transaction involving the customer and the corresponding counterparty in accordance with the elements of transaction data 206.

In some examples, and prior to executing the requested payment transaction, verifier computing system 150 may perform any of the exemplary processes described herein to verify an availability of the counterparty account to fund, or receive proceeds from, the requested payment transaction based on privacy-preserving, homomorphic computations involving an array of homomorphically encrypted account identifiers maintained at distributed computing system 160. As described herein, each of the homomorphically encrypted identifiers may be associated with a corresponding account that is issued by a source financial institution associated a corresponding one of source computing systems 110 (e.g., source computing system 112, etc.), and further, that is unavailable to fund, or to receive proceeds from, the payment transaction characterized by payment request 204. Through the performance of these privacy-preserving homomorphic computations by the distributed components of distributed computing system 160, verifier computing system 150 may verify in real time, and contemporaneously with the receipt of payment request 204, the availability of the counterparty account to fund, or receive proceeds from, the requested payment transaction without accessing any of the sensitive elements of customer and account data maintained at the corresponding one of source computing systems 110, and without exposing sensitive elements of customer and account data to unauthorized third parties or unrelated financial institutions.

Referring back to FIG. 2A, API 202 may route payment request 204 to a local account verification engine 210 executed by the one or more processors of verifier computing system 150, and executed local account verification engine 210 may perform operations that store payment request 204 within the one or more tangible, non-transitory memories of verifier computing system 150, e.g., within a portion of data repository 212. Based on the receipt of payment request 204, executed local account verification engine 210 may perform operations that cause verifier computing system 150 to establish a secure, programmatic channel of communication across network 120 with distributed computing system 160, e.g., via a programmatic interface, such an application programmatic interface (API). For example, executed local account verification engine 210 may establish the secure, programmatic channel of communications with an account verification API 214 established and maintained by a homomorphic verification engine 216 executed by the distributed components of distributed computing system 160. Based on the established programmatic communications channel, executed local account verification engine 210 may perform operations that access account verification data store 166 (e.g., as maintained by the distributed components of distributed computing system 160), and obtain homomorphic encryption key 122 maintained within cryptographic data 168 of account verification data store 166.

By way of example, executed local account verification engine 210 may perform operations that request, from executed homomorphic verification engine 216 via account verification API 214, access to homomorphic encryption key 122 maintained within account verification data store 166, and based on the request, executed homomorphic verification engine 216 may obtain homomorphic encryption key 122 from account verification data store 166 and transmit homomorphic encryption key 122 across network 120 to verifier computing system 150. Although not illustrated in FIG. 2A, verifier computing system 150 may receive homomorphic encryption key 122 from distributed computing system 160 via API 202, and executed local account verification engine 210 may perform operations that store locally homomorphic encryption key 122 within one or more tangible, non-transitory memories, such as within data repository 212.

In some instances, a pre-processing module 218 of executed local account verification engine 210 may access payment request 204, and obtain counterparty name 208A (e.g., "John Q. Stone") and account number 208B of the counterparty account associated with the requested payment transaction (e.g., a sixteen-digit account number "6789-5432-5678-1234"). Based on portions of counterparty name 208B and account number 208D, executed pre-processing module 218 may generate a numerical account identifier 220 (e.g., a numerical account identifier $A_{CP}$) representative of the counterparty account involved in the requested payment transaction. Numerical account identifier 220 may, for example, be characterized by a predetermined length or format (e.g., an integer having a predetermined number of digits, etc.), which may be consistent with, or equivalent to, the numerical character strings included within each of the numerical account identifiers of pre-processed account data 128 described herein, e.g., that are representative of the unavailable accounts issued by the source financial institution associated with source computing system 112.

Examples of numerical account identifier 220 may include, but are not limited to, all, or a selected portion of, account number 208D (e.g., all, or a selected portion of, the sixteen-digit account number "6789-5432-5678-1234"), or a hash value generated by executed pre-processing module 218 based on an application of a corresponding hash function to all, or a portion of, account number 208D. In other examples, executed pre-processing module 218 may perform operations that generate a numerical character string based on all, or a selected portion, of counterparty name 208A (e.g., "John Q. Stone") either alone or in conjunction with a portion of account number 208B. For example, executed pre-processing module 218 may perform operations that obtain the full name of the corresponding counterparty (e.g., "John Q. Stone") from counterparty name 208B, and that generate a character string based on a concatenation of the customer's first and last names, e.g., "JohnStone." Executed pre-processing module 218 may also perform operations that input the concatenation of the customer's first and last name into a corresponding hash function, and that establish resulting hash value (e.g., the numerical character string of predetermined length) as numerical account identifier 220.

Additionally, or alternatively, executed pre-processing module 218 may perform operations that generate a character string based on a concatenation of a portion of counterparty name 208B and a portion of counterparty account number 208D (e.g., "Stone56781234," etc.), that input the concatenated portions of counterparty name 208B and counterparty account number 208D into a corresponding hash function, and further, that establish resulting hash value as numerical account identifier 220. The disclosed embodiments are, however, not limited to these exemplary numerical identifiers representative of portions of counterparty name 208A and/or a portion of counterparty account number 208B, and in other instances, executed pre-processing module 218 may perform any of the operations described herein to generate numerical account identifier 220 based on any additional, or alternate, portion of counterparty name 208A or counterparty account number 208B, or any additional, or alternate, combination thereof.

As illustrated in FIG. 2A, pre-processing module 218 may provide numerical account identifier 220 as an input to an encryption module 222 of executed local account verification engine 210. Executed encryption module 222 may, for example, receive numerical account identifier 220, may obtain homomorphic encryption key 122 from data repository 212, and may obtain one or more elements of salt data 224. In some examples, salt data 224 may include a random number (e.g., R) having a predetermined length, and executed encryption module 222 may obtain the elements of salt data 224 from the one or more tangible, non-transitory memories of verifier computing system 150 (e.g., from data repository 212), or may generate random number R, and the elements of salt data 224, based on an output of one or more hardware-based random number generation processes or computational, pseudorandom number generation processes.

In some examples, executed encryption module 222 may compute a sum of numerical account identifier 220 (e.g., numerical account identifier $A_{CP}$) and random number R (e.g., $A_{CP}+R$), and may encrypt the computed sum using homomorphic encryption key 122 and generate a corresponding element 226 of homomorphically encrypted verification data (e.g., $E(A_{CP}+R)$). As illustrated in FIG. 2A, executed encryption module 222 may package element 226 of homomorphically encrypted verification data $E(A_{CP}+R)$ into a corresponding portion of verification request 228, and executed local account verification engine 210 may perform operations that cause verifier computing system 150 to transmit verification request 228 across network 120 to distributed computing system 160, e.g., across the secure, programmatic communications channel established with account verification API 214.

Account verification API 214 of distributed computing system 160 may receive verification request 228, and may route verification request 228 to executed homomorphic verification engine 216. In some instances, executed homomorphic verification engine 216 may parse verification request 228, and obtain element 226 of homomorphically encrypted verification data $E(A_{CP}+R)$ (e.g., the homomorphically encrypted sum of numerical string $A_{CP}$ and random number R). Further, executed homomorphic verification engine 216 may also perform operations that access each of the homomorphically encrypted account identifiers maintained within encrypted account database 172 of account verification data store 166. In some instances, and as described herein, each of the homomorphically encrypted account identifiers may be maintained within encrypted account database 172 may be representative of an account that is issued by a corresponding one of the source financial institutions associated with source computing systems 110, and that is unavailable to fund, or receive proceeds from, a corresponding payment transaction, such as, but not limited to, the payment transaction requested by the customer of the verifier computing system and involving the counterparty account.

As described herein, encrypted account database 172 may include, but is not limited to, data records 170, each of which includes an encrypted account identifier provisioned to distributed computing system 160 by source computing system 112 using any of the exemplary processes described herein. For example, encrypted data record 137 of encrypted account database 172 may include encrypted account identifier 136, which is representative of, the unavailable checking account issued by the source financial institution associated with source computing system 112. Further, although not illustrated in FIG. 2A, encrypted account database 172 may include additional data records that include additional encrypted account identifiers, and each of the additional encrypted account identifiers may be associated with, and representative of, an additional unavailable account issued by a corresponding one of the source financial institutions associated with an additional, or alternate, one of source computing systems 110.

In some instances, the data records of encrypted account database 172, and the homomorphically encrypted account identifiers maintained within these data records, may collectively establish a "list" of encrypted account identifiers representative of corresponding accounts that are issued by the source financial institutions associated with source computing systems 110 and further, that are unavailable to fund, or receive proceeds from, initiated or requested payment transactions. The established list may, for example, correspond to a linear array $E_U$ having a plurality of discrete elements, each of which include a corresponding one of encrypted account identifiers. For example, the linear array may be represented as:

$$E_U = \{E(A_{U,1}), E(A_{U,2}), E(A_{U,3}), \ldots E(A_{U,N})\},$$

where N corresponds to the total number of encrypted account identifiers maintained within the data records of encrypted account database 172, and where each of $E(A_{U,1})$, $E(A_{U,2})$, $E(A_{U,3})$, ... $E(A_{U,N})$ represent a corresponding one of the N encrypted account identifiers maintained within encrypted account database 172.

Referring back to FIG. 2A, executed homomorphic verification engine 216 may perform operations that access each of the data records of encrypted account database 172, and obtain a corresponding one of the homomorphically encrypted account identifiers maintained within the accessed data record (e.g., an element of linear array $E_U$, as described herein). In some instances, executed homomorphic verification engine 216 may perform homomorphic computations on the encrypted account identifiers and the homomorphically encrypted verification data $E(A_{CP}+R)$ maintained within verification request 228, and based on the performance of these homomorphic computations, executed homomorphic verification engine 216 may compute an encrypted residual value associated with each of the encrypted account identifiers within linear array $E_U$. For example, each of the encrypted residual values may represent a difference between a corresponding one of the encrypted account identifiers within linear array $E_U$ and the element of encrypted verification data $E(A_{CP}+R)$, and executed homomorphic verification engine 216 may package each of the encrypted residual values (e.g., the encrypted differences) into a corresponding element of encrypted results data 230.

By way of example, encrypted account database 172 may include one or more discrete data records, such as encrypted data records 170, that maintain encrypted account identifiers provisioned to distributed computing system 160 by source computing system 112. For instance, as illustrated in FIG. 2A, encrypted data records 170 may include discrete data record 137, and as described herein, discrete data record 137 may maintain encrypted account identifier 136, which is representative of the unavailable checking account issued by the source financial institution associated with source computing system 112. In some examples, executed homomorphic verification engine 216 may perform any of the exemplary processes described herein to compute the encrypted residual value for encrypted account identifier 136 based on a determined difference between encrypted account identifier 136 and the element of encrypted verification data $E(A_{CP}+R)$ maintained within verification request 228, and may package the encrypted residual value into a corresponding element 232 of encrypted results data 230.

Executed homomorphic verification engine 216 may also perform any of the exemplary processes described herein to compute an additional encrypted residual value for the encrypted account identifier maintained within each additional, or alternate, one of encrypted data records 170 (e.g., as a difference between each of the encrypted account identifiers and the element of encrypted verification data $E(A_{CP}+RAND)$ maintained within verification request 228), and to package the additional encrypted residual values into a corresponding element of encrypted results data 230. Further, encrypted account database 172 may include additional, or alternate, discrete data records that maintain further encrypted account identifiers provisioned to distributed computing system 160 by additional, or alternate, ones of source computing systems 110 (e.g., and that are representative of unavailable accounts issued by source financial institutions associated with the additional, or alternate, ones of source computing systems 110). In some instances, homomorphic verification engine 216 may perform any of the exemplary processes described herein to compute a further encrypted residual for each of these further encrypted account identifiers, and to package the each of the further encrypted account identifiers into a corresponding element of encrypted results data 230.

In some examples, the elements of encrypted results data 230 correspond to, and establish, a linear array $E_R$ of encrypted residual values, e.g., encrypted differences between corresponding ones of the homomorphically encrypted account identifiers maintained within encrypted account database 172 and the homomorphically encrypted verification data $E(A_{CP}+RAND)$ maintained within verification request 228. By way of example, the linear array $E_R$ may be represented as:

$$E_R = \{E(R_1), E(R_2), E(R_3), \ldots E(R_N)\},$$

where N corresponds to the total number of encrypted account identifiers maintained within the data records of encrypted account database 172, and where each of $E(R_1)$, $E(R_2)$, $E(R_3)$, ... $E(R_N)$ represent a corresponding one of the N encrypted residual values. Further, each of $E(R_1)$, $E(R_2)$, $E(R_3)$, ... $E(R_N)$ may be defined as:

$$E(R_1) = E(A_{U,1}) - E(A_{CP} + RAND),$$
$$E(R_2) = E(A_{U,2}) - E(A_{CP} + RAND),$$
$$E(R_3) = E(A_{U,3}) - E(A_{CP} + RAND),$$
$$\vdots$$
$$E(R_N) = E(A_{U,N}) - E(A_{CP} + RAND).$$

Additionally, and based on the properties of the homomorphic encryption schemes described herein, each of $E(R_1)$, $E(R_2)$, $E(R_3)$, ... $E(R_N)$ may be further expressed as:

$$E(R_1) = E(A_{U,1} - A_{CP} - RAND),$$
$$E(R) = E(A_{U,2} - A_{CP} - RAND),$$
$$E(R_3) = E(A_{U,3} - A_{CP} - RAND),$$
$$\vdots$$
$$E(R_N) = E(A_{U,N} - A_{CP} - RAND).$$

Executed homomorphic verification engine 216 may perform operations that store the elements of encrypted results data 230, and linear array $E_R$, within one or more tangible, non-transitory memories accessible to distributed computing system 160, such as within account verification data store 166.

Executed homomorphic verification engine 216 may perform operations that cause one or more of the distributed components of distributed computing system 160 to transmit all, or a selected portion of, the elements of encrypted results data 230 (including element 232 associated with the unavailable checking account issued by the source financial institution of source computing system 112) across network 120 to one or more of source computing systems 110, such as source computing system 112. In some instances, the one or more of source computing systems 110, such as source computing system 112, may receive all, or a selected portion of, the elements of encrypted results data 230, from distributed computing system 160. Further, the one or more of source computing systems 110, including source computing system 112, may perform any of the exemplary processes described herein to decrypt the elements of encrypted results data 230 using a locally maintained homomorphic decryption key (e.g., homomorphic decryption key 124) and to transmit the decrypted elements of results data across network 120 to distributed computing system 160. As described herein, one or more of the distributed components of distributed computing system 160 may perform additional operations that package the decrypted elements of results data received from source computing system 112 (and in some instances, from each additional, or alternate, one of source computing systems 110) into a corresponding portion of a response to verification request 228, which distributed computing system 160 may provision to verifier computing system 150 across the established programmatic channel of communications, e.g., in accordance with one or more cryptographic protocols, such as, but not limited to, a SSL or TLS protocol.

Figure 2B:
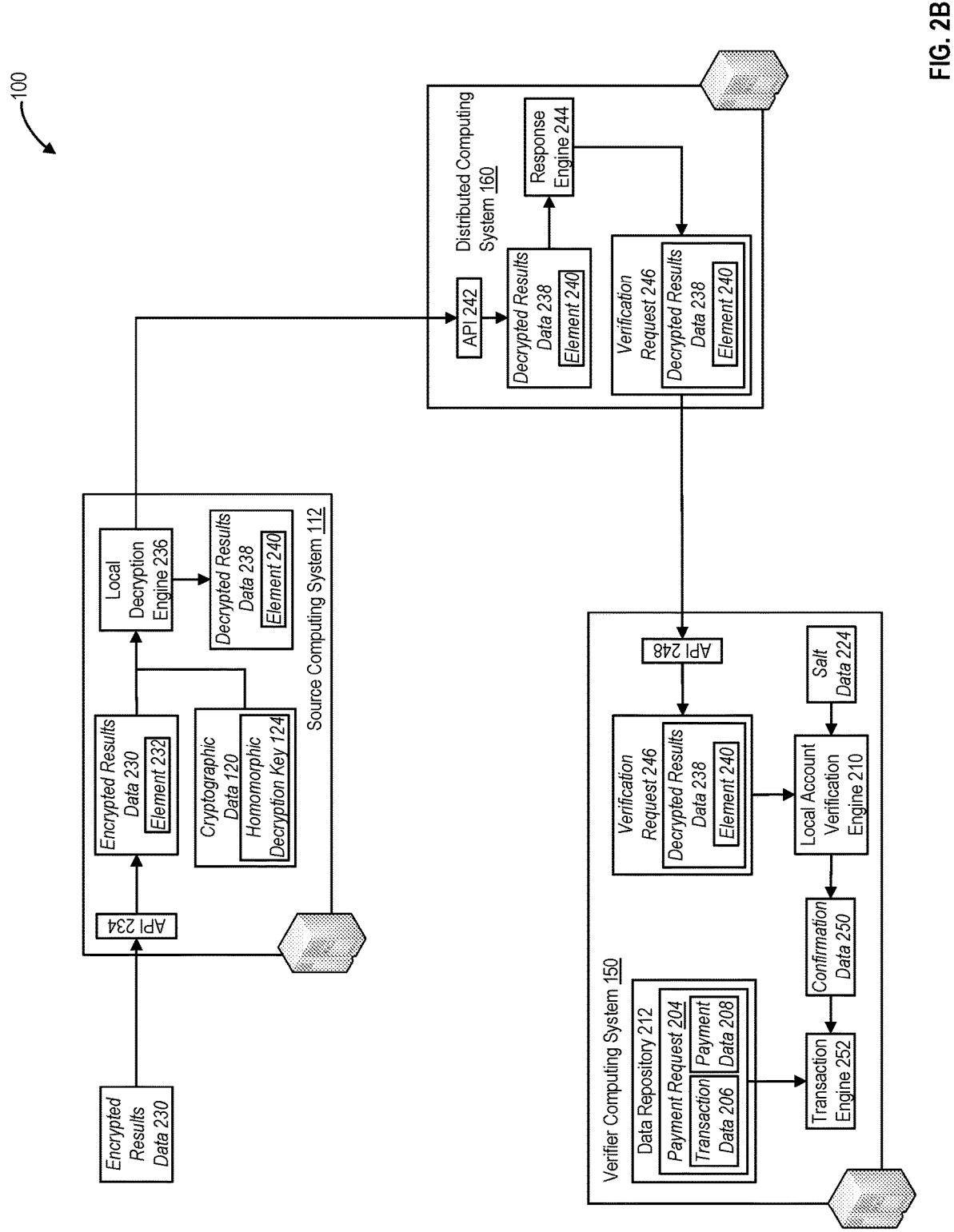

Referring to FIG. 2B, a programmatic interface established and maintained by source computing system 112, such as application programming interface (API) 234, may receive all, or a selected portion, of encrypted results data 230 from distributed computing system 160, and may route encrypted results data 230 to a local decryption engine 236 executed by the one or more processors of source computing system 112. As described herein, each of the elements of encrypted results data 230 may be derived from a corresponding one of the encrypted account identifiers included within the data records of encrypted data records 170, and further, may represent a homomorphically encrypted difference between the corresponding one of the homomorphically encrypted account identifiers and the homomorphically encrypted verification data $E(A_{CP}+RAND)$ maintained within verification request 228. Further, and as described herein, the homomorphically encrypted verification data $E(A_{CP}+RAND)$ may correspond to a homomorphically encrypted sum of an account identifier representative the counterparty account involved in the requested payment transaction ($A_{CP}$) and a corresponding random number (RAND).

Executed local decryption engine 236 may receive the elements of encrypted results data 230 from API 234, and although not illustrated in FIG. 2B, executed local decryption engine 236 may store encrypted results data 230 within a corresponding portion of a tangible, non-transitory memory, e.g., within a portion of data repository 114. Executed local decryption engine 236 may also access data repository 114, and obtain homomorphic decryption key 124 from cryptographic data 119. In some instances, executed local decryption engine 236 may decrypt each of the elements of encrypted results data 230, and package each of the decrypted elements into a corresponding portion of decrypted results data 238. For example, and as described herein, encrypted results data 230 may include element 232 derived from homomorphically encrypted account identifier 136 representative of the unavailable checking account issued by the source financial institution associated with source computing system 112 (e.g., as maintained within data record 137 of data records 170), and executed local decryption engine 236 may decrypt element 232 using homomorphic decryption key 124 and package decrypted element 232 into a corresponding portion of decrypted results data 238, e.g., as element 240.

In some instances, local decryption engine 236 may perform operations that cause source computing system 112 to transmit decrypted results data 238, including element 240, across network 120 to distributed computing system 160. Further, although not illustrated in FIG. 2B, one or more of the additional, or alternate, ones of source computing systems 110 may receive a corresponding subset of the elements of encrypted results data 230 from distributed computing system 160, e.g., via a corresponding programmatic interface. In some instances, each of these additional, or alternate, ones of source computing systems 110 may perform any of the exemplary processes described herein to obtain a locally maintained copy of a homomorphic decryption key, such as homomorphic decryption key 124, from one or more tangible, non-transitory memories, to decrypt the portions of the elements of encrypted results data 230 using the locally maintained homomorphic decryption key, and to transmit the corresponding elements of decrypted results data across network 120 to distributed computing system 160.

By way of example, a programmatic interface established and maintained by one or more of the distributed components of distributed computing system 160, such as application programming interface (API) 242, may receive decrypted results data 238 (including element 240) from source computing system 112 (and in some instances, may also receive elements of decrypted results data from additional, or alternate, ones of source computing systems 110). API 242 may route decrypted results data 238 (including element 240), and each of the additional elements of decrypted results data, to a response engine 244 executed by the distributed components of distributed computing system 160. As illustrated in FIG. 2B, executed response engine 244 may receive decrypted results data 238 (and each of the additional elements of decrypted results data) from API 242, and may perform operations that package each element of decrypted results data 238 (and the additional elements of decrypted results data) into corresponding portions of verification response 246.

In some instances, the elements of decrypted results data (e.g., including element 240 of decrypted results data 238) maintained within verification response 246 may correspond to, and establish, a linear array R of decrypted residual values, e.g., decrypted differences between corresponding ones of the encrypted account identifiers maintained within encrypted account database 172 and the homomorphically encrypted verification data E($A_{CP}$+R) maintained within verification request 228. By way of example, the linear array R may be represented as:

$$R=(R_1, R_2, R_3, \ldots R_N).$$

As described herein, N corresponds to the total number of homomorphically encrypted account identifiers maintained within the data records of encrypted account database 172, and each of $R_1, R_2, R_3, \ldots R_N$ represent a corresponding one of the N decrypted residual values. Further, each of $R_1, R_2, R_3, \ldots R_N$ may be defined as:

$$R_1 = A_{U,1} - A_{CP} - RAND,$$
$$R_2 = A_{U,2} - A_{CP} - RAND,$$
$$R_3 = A_{U,3} - A_{CP} - RAND,$$
$$\vdots$$
$$R_N = A_{U,N} - A_{CP} - RAND.$$

Referring back to FIG. 2B, executed response engine 244 may perform operations that cause distributed computing system 160 to transmit verification response 246 across network 120 to verifier computing system 150, e.g., as in response to verification request 228. In some instances, distributed computing system 160 may provision verification response 246 across the secure programmatic channel of communications established between verifier computing system 150 and distributed computing system 160, e.g., in accordance with one or more cryptographic protocols, such as, but not limited to, a SSL or TLS protocol.

In some instances, a programmatic interface established and maintained by verifier computing system 150, such as application programming interface (API) 248 associated with executed local account verification engine 210, may receive verification response 246 from distributed computing system 160. API 248 may, for example, provide verification response 246 as an input to executed local account verification engine 210, may perform any of the exemplary processes described herein to determine whether the counterparty account involved in the requested payment transaction (e.g., as specified by counterparty account number 208D of payment data 208) based on one or more of the elements of verification response 246 (e.g., the elements of linear array R of decrypted residual values, which may include decrypted differences between corresponding ones of the encrypted account identifiers maintained within encrypted account database 172 and the homomorphically encrypted verification data E($A_{CP}$+RAND) maintained within verification request 228).

Executed local account verification engine 210 may access each of the elements of verification response 246 (e.g., an element of linear array R of decrypted residual values), and may compute an absolute value of each the decrypted residual value maintained within each of the accessed elements. Executed local account verification engine 210 may also obtain random number RAND from salt data 224, and may perform operations that compare each of the computed absolute values to random number R, and that determine whether at least one of computed absolute values is equivalent to random number RAND based on the comparison. If, for example, executed local account verification engine 210 were to determine that at least one of the computed absolute values is equivalent to random number RAND, executed local account verification engine 210 may establish that the counterparty account is unavailable to fund, or receive proceeds from, the requested payment transaction. Alternatively, if executed local account verification engine 210 were to determine that none of the computed absolute values are equivalent to random number R, executed local account verification engine 210 may establish that the counterparty account is available to fund, or receive proceeds from, the requested payment transaction. In some instances, executed local account verification engine 210 may generate one or more elements of confirmation data 250 indicative of the established availability, or the established unavailability, of the counterparty account to fund, or receive proceeds from, the requested payment transaction.

For instance, executed local account verification engine 210 may access element 232 of decrypted results data from verification response 246. As described herein, element 232 may be derived from homomorphically encrypted account identifier 136 representative of the unavailable checking account issued by the source financial institution associated with source computing system 112 (e.g., as maintained within data record 137 of data records 170). Further, and as described herein, element 232 may include a decrypted residual value (e.g., one of the elements of linear array R) that corresponds to the decrypted difference between encrypted account identifier 136 representative of the unavailable checking account (e.g., E($A_{U,CHECKING}$)) and the homomorphically encrypted verification data E($A_{CP}$+

RAND). By way of example, if the counterparty account were to correspond to the unavailable checking account, then the numerical account identifier of the counterparty account $A_{CP}$ would be equivalent to the numerical account identifier $A_{U,CHECKING}$ of the unavailable checking account, and the computed absolute value of the decrypted residual value may correspond to $$|R_{U,CHECKING}|=|A_{U,CHECKING}-A_{CP}-\text{RAND}|=\text{RAND}.$$

Based on a determination that the computed absolute value of the decrypted residual value is equivalent to random number RAND, executed local account verification engine 210 may establish that the counterparty account is unavailable to fund, or receive proceeds from, the requested payment transaction, and generate the one or more elements of confirmation data 250 indicative of the established unavailability of the counterparty account.

Alternatively, if the counterparty account were to differ from the unavailable checking account, then the numerical account identifier of the counterparty account $A_{CP}$ would differ from the numerical account identifier $A_{U,CHECKING}$ of the unavailable checking account, and the computed absolute value of the decrypted residual value would not be equivalent to random number RAND, e.g., $|R_{U,CHECKING}| \neq \text{RAND}$. Based on a determination that the computed absolute value of the decrypted difference is not equivalent to random number RAND, executed local account verification engine 210 may perform any of the exemplary processes described herein to determine whether the computed absolute value of each additional, or alternate, element of verification response 246 (e.g., an additional, or alternate, element of linear array R of decrypted residual values) is equivalent to random number RAND. If executed local account verification engine 210 were to determine that the computed absolute value of none of the additional, or alternate, elements of verification response 246 is equivalent to random number R, executed local account verification engine 210 may establish that the counterparty account is available to fund, or receive proceeds from, the requested payment transaction, and generate the one or more elements of confirmation data 250 indicative of the established availability of the counterparty account.

Referring back to FIG. 2B, local account verification engine 210 may provision confirmation data 250, which indicates the established availability, or unavailability, of the counterparty account to a transaction engine 252 executed by the one or more processors of verifier computing system 150. In some examples, if confirmation data 250 were to indicate that the counterparty account were available to fund, or receive proceeds from, the requested purchase transaction, executed transaction engine 252 may perform operations that execute the requested payment transaction involving the customer and the corresponding counterparty in accordance with the elements of transaction data 206 and payment data 208. For instance, transaction execution engine 252 may generate a structured message that include selected portions of transaction data 206 and payment data 208, and may perform operations that cause verifier computing system 150 to transmit the structured message across network 120 to one computing systems associated with payment processing network (e.g., a payment rail, etc.), an automated clearinghouse (ACH) network (e.g., a direct deposits of funds into the counterparty account), or a real-time payment (RTP) network (not illustrated in FIG. 2B).

Alternatively, confirmation data 250 may indicate that the counterparty account is unavailable to fund, or receive proceeds from, the requested purchase transaction, and executed transaction engine 252 may decline to execute the requested payment transaction involving the counterparty account. In some instances, executed transaction engine 252 may generate an error message indicative of the declined payment transaction (and additionally, or alternatively, the unavailability of the counterparty account), and may perform operations that cause verifier computing system 150 to transmit the error message across network 120 to one or more computing systems or computing devices associated with payment request 204, such as, but not limited to the customer device or the one or more computing systems of the ACH network, the RTP network, or other payment-processing network described herein.

As described herein, the distributed components of distributed computing system 160 may establish and maintain, within a corresponding distributed file system (e.g., the HDFS described herein), an array of homomorphically encrypted identifiers representative of accounts that are issued by the source computing systems associated with source computing systems 110 and that are unable to fund, or receive proceeds from, payment transactions. In some instances, distributed computing system 160 may receive, from a computing system of a verifier financial institution, an element of homomorphically encrypted verification data associated with a counterparty account (e.g., across network 120 via account verification API 214), which may be involved in a payment transaction requested or initiated by a customer of the verifier financial institution. Based on the received element of homomorphically encrypted verification data, the distributed components of distributed computing system 160 may perform any of the exemplary processes described herein to compute an encrypted residual value for each of the encrypted identifiers maintained within the account verification data store 166, and to transmit the encrypted residual values to one or more of source computing systems 110 (e.g., for decryption using homomorphic decryption key 124). Distributed computing system 160 may receive decrypted residual values from the one or more of source computing systems 110, and may transmit a response to the verification request that include the decrypted residual values to the computing system of the verifier financial institution, which may perform any of the exemplary processes described herein to verify an availability of the counterparty account based on the decrypted differences.

Through a performance of privacy-preserving homomorphic computations on elements of encrypted data maintained by the distributed components of distributed computing system 160, certain of the exemplary processes described herein may facilitate a determination, by a verifier computing system, of an availability of a counterparty account issued by a counterparty financial institution to fund, or receive proceeds from, a payment transaction without accessing directly any sensitive elements of customer or account data maintained by the counterparty financial institution, and without exposing the sensitive elements of customer or account data to unauthorized parties. Further, the distributed components of distributed computing system 160 may perform these privacy-preserving homomorphic computations on these elements of encrypted data in parallel through an implementation of parallelized, fault-tolerant distributed computing and analytical protocols described herein, e.g., across clusters of CPUs, GPUs, or TPUs.

In many instances, however, the array of homomorphically encrypted identifiers maintained at distributed computing system 160 may include, or may exceed, tens or hundreds of thousands of discrete encrypted identifiers associated with corresponding unavailable accounts. Due to the large number of encrypted identifiers maintained by distributed computing system 160, the performance of the privacy-preserving homomorphic computations described herein, which compute a difference between each of the homomorphically encrypted identifiers and a received element of homomorphically encrypted verification data (e.g., $E(A_{CP}+\text{RAND})$), may consume significant computational resources and require significant computational time, even when implemented in parallel across the distributed components of distributed computing system 160. The computational time and resources associated with the homomorphic computations involving each of the homomorphically encrypted identifiers maintained by distributed computing system may also render impractical any verification of an availability of the counterparty account in real time and contemporaneously with the receipt of verification request 228 from verifier computing system 150.

In some examples, and in view of the significant computational resources and time resulting from the computation of the homomorphically encrypted difference for each of the array of homomorphically encrypted identifiers, distributed computing system 160 may perform additional, or alternate, processes, described below in reference to FIG. 3, that partition the array of homomorphically encrypted identifiers into a plurality of discrete partitions, and perform homomorphic computations that confirm a presence of an element of homomorphically encrypted verification data within one or more of the discrete array partitions. These additional or alternate processes, when implemented in parallel by the distributed components of distributed computing system 160 (e.g., via one or more the parallelized, fault-tolerant distributed computing and analytical protocols described herein) may enable distributed computing system 160 to verify an availability of a counterparty account to fund, or receive proceeds from, a payment transaction requested by a customer of the verifier financial institution, while reducing a consumption of computational resources by, and a computation time associated with, the exemplary account verification processes described herein.

Figure 3A:
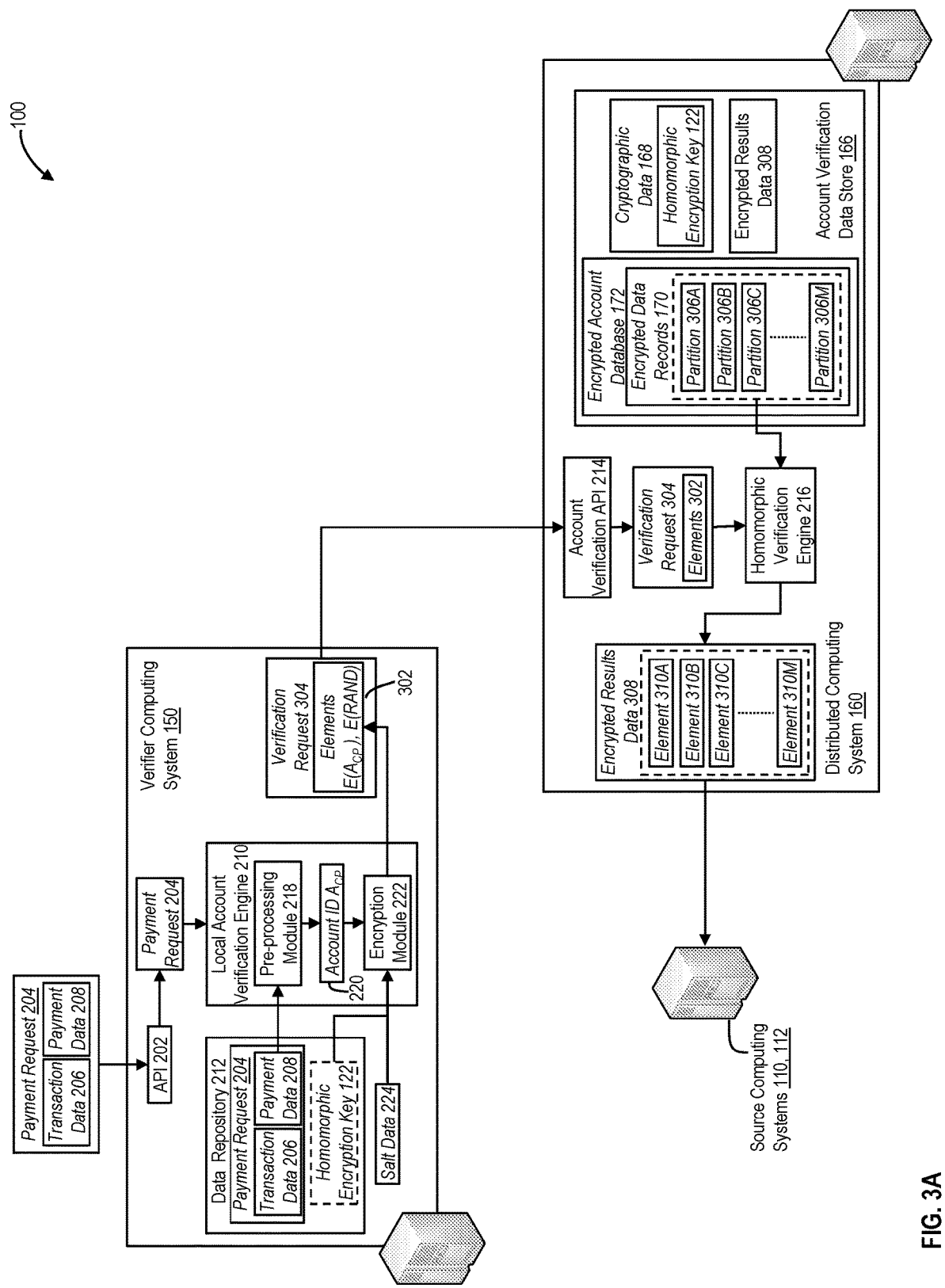

Referring to FIG. 3A, and response to a receipt of payment request 204 at verifier computing system 150, executed encryption module 222 of local account verification engine 210 may perform any of the exemplary processes described herein to generate numerical account identifier 220 (e.g., numerical account identifier $A_{CP}$), and to parse salt data 224 and obtain random number RAND. Executed encryption module 222 may also obtain homomorphic encryption key 122, may encrypt each of the numerical string $A_{CP}$ and random number R using homomorphic encryption key 122 (e.g., to yield $E(A_{CP})$ and $E(\text{RAND})$), and further, may generate elements 302 of homomorphically encrypted verification data that include the encrypted numerical string $E(A_{CP})$ and the encrypted random number $E(\text{RAND})$). In some instances, executed encryption module 222 may package elements 302 of homomorphically encrypted verification data into corresponding portions of verification request 304, and executed local account verification engine 210 may perform operations that cause verifier computing system 150 to transmit verification request 304 across network 120 to distributed computing system 160, e.g., across the secure, programmatic communications channel established with account verification API 214.

Account verification API 214 of distributed computing system 160 may receive verification request 304, and may route verification request 304 to executed homomorphic verification engine 216. In some instances, executed homomorphic verification engine 216 may parse verification request 304, and obtain elements 302 of homomorphically encrypted verification data, which include the include the encrypted numerical string $E(A_{CP})$ and the encrypted random number $E(\text{RAND})$), and may store the encrypted numerical string $E(A_{CP})$ and the encrypted random number $E(\text{RAND})$) within one or more tangible, non-transitory memories, e.g., within a portion of account verification data store 166. Further, executed homomorphic verification engine 216 may access array $E_U$ of encrypted account identifiers maintained within encrypted account database 172. For example, and as described herein, the array $E_U$ may be represented as:

$$E_U = \{E(A_{U,1}), E(A_{U,2}), E(A_{U,3}), \ldots E(A_{U,N})\},$$

where N corresponds to the total number of encrypted account identifiers maintained within encrypted account database 172, and where each of $E(A_{U,1})$, $E(A_{U,2})$, $E(A_{U,3})$, ... $E(A_{U,N})$ represents a corresponding one of the N encrypted account identifiers.

Executed homomorphic verification engine 216 may perform operations that partition array $E_U$ into a plurality of M discrete array partitions, shown generally in FIG. 3A as partitions 306A, 306B, 306C, ... 306M. Each of the plurality of M discrete array partitions may include a subset of the homomorphically encrypted account identifiers maintained within encrypted account database 172, and in some instances, executed homomorphic verification engine 216 may partition array $E_U$ into the plurality of M discrete array partitions, and populate each of the discrete array partitions with the corresponding subset of the homomorphically encrypted account identifiers, in accordance with the modulo partitioning process (e.g., $E_U \mod (N)$). The disclosed embodiments are, however, not limited to modulo partitioning processes, and in other instances, executed homomorphic verification engine 216 may perform operations that partition array $E_U$ into the plurality of M discrete array partitions, and populate each of the discrete array partitions, in accordance with any additional or alternate partitioning scheme or process appropriate to array $E_U$, the homomorphically encrypted account identifiers, and the distributed components of distributed computing system 160 (e.g., on the basis of a source financial institution associated with each of the homomorphically encrypted account identifiers, etc.).

In some instances, executed homomorphic verification engine 216 may obtain the encrypted account identifier $E(A_{CP})$ from account verification data store 166, and based on performance of homomorphic computations on the encrypted numerical string $E(A_{CP})$ and the encrypted account identifiers within each of the plurality of M discrete array partitions, compute an encrypted residual value for each of the plurality of M discrete array partitions, e.g., for each of the partitions 306A, 306B, 306C, ... 306M. Further, executed homomorphic verification engine 216 may obtain the encrypted random number $E(\text{RAND})$ from account verification data store 166, and based on a performance of additional homomorphic computations involving each of encrypted residual values and random number $E(\text{RAND})$, executed homomorphic verification engine 216 may compute, for each of the plurality of M discrete array partitions, a sum of a corresponding one of the encrypted residual values and the encrypted random number $E(\text{RAND})$. As illustrated in FIG. 3A, executed homomorphic verification engine 216 may package each of the computed sums into a corresponding element of encrypted results data 308.

By way of example, executed homomorphic verification engine 216 may access a first one of the discrete array partitions of array $E_U$, e.g., partition 360A. In some instances, partition 306A may be populated with a plurality L of homomorphically encrypted account identifiers, e.g., $E(A_{U,1})$, $E(A_{U,2})$, $E(A_{U,L})$, and executed homomorphic verification engine 216 may compute an encrypted residual value of these homomorphically encrypted account identifiers with respect to encrypted numerical string $E(A_{CP})$, as follows:

$$E(R_1)=(E(A_{U,1})-E(A_{CP}))(E(A_{U,2})-E(A_{CP}))(E(A_{U,L})-E(A_{CP})),$$

where L represents the total number of homomorphically encrypted account identifiers within partition 306. Further, executed homomorphic verification engine 216 may also perform operations that compute an encrypted sum $E(S_1)$ of the encrypted residual value and the encrypted random number E(RAND), as follows:

$$E(S_1)=E(R_1)+E(RAND).$$

Executed homomorphic verification engine 216 may packed the encrypted sum $E(S_1)$ into a corresponding, partition-specific elements 310A of encrypted results data 308.

Executed homomorphic verification engine 216 may also perform any of the exemplary processes described herein to compute, for each additional or alternate one of the plurality of M discrete array partitions (e.g., partitions 306B, 306C, . . . 306M of FIG. 3A), an encrypted residual value and an encrypted sum, and to package each of the encrypted sums into a corresponding elements of encrypted results data 308, e.g., within corresponding ones of partition-specific elements 310B, 310B, . . . 310M. By way of example, partition-specific elements 310A, 310B, 310B, . . . 310M of encrypted results data 308 correspond to, and establish, a linear array $E_S$ of homomorphically encrypted sums associated with each of the plurality of M discrete array partitions, e.g., $E_S=\{E(S_1), E(S_2), E(S_3), \ldots E(S_M)\}$. Executed homomorphic verification engine 216 may also perform operations that cause one or more of the distributed components of distributed computing system 160 to transmit encrypted results data 308 across network 120 to one or more of source computing systems 110, such as source computing system 112.

Figure 3B:
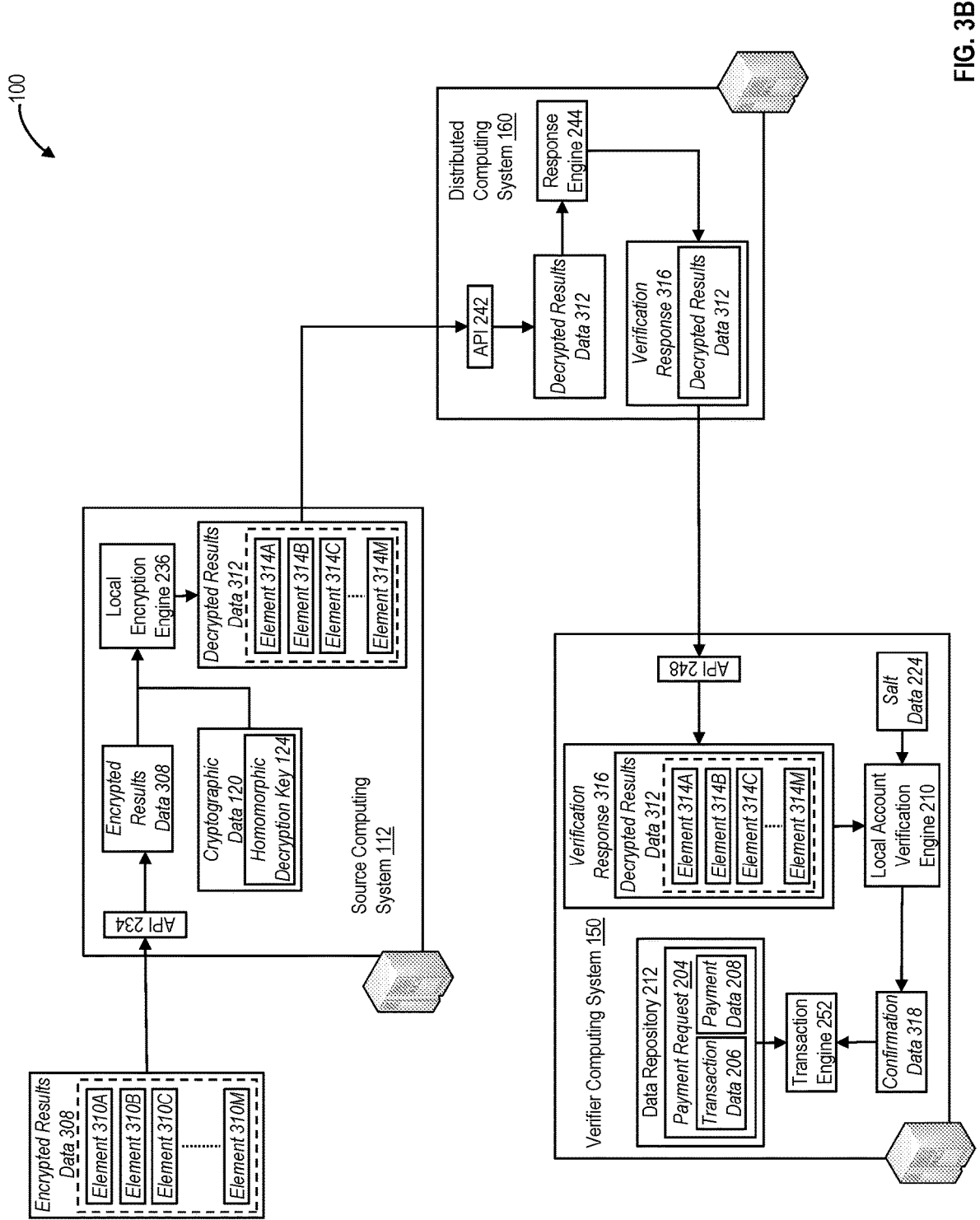

Referring to FIG. 3B, a programmatic interface established and maintained by source computing system 112, such as API 234, may receive the partition-specific elements of encrypted results data 308 from distributed computing system 160, and may route the partition-specific elements of encrypted results data 308 to executed local decryption engine 236. In some instances, executed local decryption engine 236 may store the partition-specific elements of encrypted results data 308 within a corresponding portion of a tangible, non-transitory memory, e.g., within a portion of data repository 114 (not illustrated in FIG. 3B). Executed local decryption engine 236 may also access data repository 114, and obtain homomorphic decryption key 124 from cryptographic data 119. In some instances, executed local decryption engine 236 may decrypt each of the partition-specific elements of encrypted results data 308 (e.g., partition-specific elements 310A, 310B, 310C, . . . 310M), and package each of the decrypted elements into a corresponding portion of decrypted results data 312.

For example, and as described herein, encrypted results data 308 may include partition-specific element 310A, which represents the sum of the encrypted residual value $E(R_1)$ associated with partition 306A of array $E_U$ and encrypted random number E(RAND), and executed local decryption engine 236 may decrypt element 310A using homomorphic decryption key 124 and package decrypted element 310 into a corresponding portion of decrypted results data 312, e.g., as decrypted element 314A. Executed local decryption engine 236 may also perform any of these exemplary process to decrypt each additional, or alternate, one of the partition-specific elements of encrypted results data 308 (e.g., partition-specific elements 310B, 310C, . . . 310M) using homomorphic decryption key 124 and package the additional, or alternate, ones of the decrypted elements into a corresponding portion of decrypted results data 312 (e.g., as (e.g., as partition-specific decrypted elements 314B, 314C, . . . 314M). In some instances, local decryption engine 236 may perform operations that cause source computing system 112 to transmit decrypted results data 312, including element 314, across network 120 to distributed computing system 160.

By way of example, a programmatic interface established and maintained by one or more of the distributed components of distributed computing system 160, such as API 242, may receive decrypted results data 312 (including partition-specific decrypted elements 314A, 314B, 314C, . . . 314M) from source computing system 112. In some instances, API 242 may route decrypted results data 312 (including partition-specific decrypted elements 314A, 314B, 314C, . . . 314M) to executed response engine 244 executed by the distributed components of distributed computing system 160, which may perform operations that package each elements of decrypted results data 312 into corresponding portions of verification response 316. In some instances, the elements of decrypted results data (e.g., including partition-specific decrypted elements 314A, 314B, 314C, . . . 314M of decrypted results data 312) maintained within verification response 316 may correspond to, and establish, a linear array S of decrypted, partition-specific sums of the residual values associated with corresponding ones of the plurality of M partitions of array $E_U$ and random number RAND, and linear array S may be represented as $S=(S_1, S_2, S_3, \ldots S_M)$. Further, each of $S_1, S_2, S_3, \ldots S_M$ may be defined as:

$$S_1 = R_1 + RAND,$$
$$S_2 = R_2 + RAND,$$
$$S_3 = R_3 + RAND,$$
$$\vdots$$
$$S_M = R_M + RAND.$$

Executed response engine 244 may perform operations that cause distributed computing system 160 to transmit verification response 316 across network 120 to verifier computing system 150, e.g., as in response to verification request 304. In some instances, distributed computing system 160 may provision verification response 316 across the secure programmatic channel of communications established between verifier computing system 150 and distributed computing system 160, e.g., in accordance with one or more cryptographic protocols, such as, but not limited to, a SSL or TLS protocol.

In some instances, a programmatic interface established and maintained by verifier computing system 150, such as application programming interface (API) 248 associated with executed local account verification engine 210, may receive verification response 316 from distributed computing system 160. API 248 may, for example, provide verification response 316 as an input to executed local account verification engine 210, which may perform any of the exemplary processes described herein to determine whether the counterparty account involved (e.g., as specified by counterparty account number 208B of payment data 208) is available to fund, or receive proceeds from, requested payment transaction based on one or more of the elements of verification response 316 (e.g., partition-specific, decrypted elements 314A, 314B, 314C, . . . 314M, which establish collectively the linear array S of decrypted, partition-specific sums).

Executed local account verification engine 210 may access the decrypted, partition-specific sum maintained within each of the elements of verification response 316, and may also obtain random number R from salt data 224. In some instances, executed local account verification engine 210 and may perform operations that compare each of the decrypted, partition-specific sums to random number R, and that determine whether at least one of decrypted, partition-specific sums is equivalent to random number RAND. If, for example, executed local account verification engine 210 were to determine that at least one of the decrypted, partition-specific sums is equivalent to random number RAND executed local account verification engine 210 may establish that the counterparty account is unavailable to fund, or receive proceeds from, the requested payment transaction. Alternatively, if executed local account verification engine 210 were to determine that none of the decrypted, partition-specific sums are equivalent to random number RAND, executed local account verification engine 210 may establish that the counterparty account is available to fund, or receive proceeds from, the requested payment transaction. In some instances, executed local account verification engine 210 may generate one or more elements of confirmation data 318 indicative of the established availability, or the established unavailability, of the counterparty account to fund, or receive proceeds from, the requested payment transaction.

For instance, executed local account verification engine 210 may access element 314A of decrypted results data from verification response 316. As described herein, element 314A may include the decrypted sum $S_1$ of the residual value $R_1$ associated with partition 306A of array $E_U$ and random number RAND. By way of example, if the counterparty account were to correspond to one of the unavailable accounts represented by the homomorphically encrypted identifiers maintained within partition 306A, then the homomorphically encrypted numerical string $A_{CP}$ would be equivalent to a corresponding one of the homomorphically encrypted identifiers maintained within partition 306A, the computed residual value $R_1$ would be zero. Executed local account verification engine 210 may, in some examples, establish that the decrypted sum $S_1$ is equivalent to random number RAND, and may determine that the counterparty account is unavailable to fund, receive proceeds from, or participate in the requested payment transaction. Further, executed local account verification engine 210 may generate the one or more elements of confirmation data 318 indicative of the established unavailability of the counterparty account.

Alternatively, if the unavailable accounts represented by the homomorphically encrypted identifiers maintained within partition 306A fail to include the counterparty account, the homomorphically encrypted numerical string $A_{CP}$ would not be equivalent to any the homomorphically encrypted identifiers maintained within partition 306A, and the computed residual value $R_1$ would be non-zero (and in some instances, a large integer value). Executed local account verification engine 210 may, for example, establish that the decrypted sum $S_1$ is not equivalent to random number RAND, and executed local account verification engine 210 may perform any of the exemplary processes described herein to determine whether the decrypted, partition-specific sum maintained within each additional, or alternate, element of verification response 316 (e.g., within each of partition-specific, decrypted elements 314B, 314C, . . . 314M) is equivalent to random number RAND. If executed local account verification engine 210 were to determine that the none of the additional, or alternate, decrypted, partition-specific sums is equivalent to random number R, executed local account verification engine 210 may establish that the counterparty account is available to fund, or receive proceeds from, the requested payment transaction, and generate the one or more elements of confirmation data 318 indicative of the established availability of the counterparty account. In other instances, if executed local account verification engine 210 were to determine that at least one of the additional, or alternate, decrypted, partition-specific sums is equivalent to random number RAND, executed local account verification engine 210 may establish that the counterparty account is unavailable to fund, or receive proceeds from, the requested payment transaction, and generate the one or more elements of confirmation data 318 indicative of the established unavailability of the counterparty account.

Referring back to FIG. 3B, local account verification engine 210 may provision confirmation data 318, which indicates the established availability, or unavailability, of the counterparty account to executed transaction engine 252. In some examples, if confirmation data 318 were to indicate that the counterparty account were available to fund, or receive proceeds from, the requested purchase transaction, executed transaction engine 252 may perform operations that execute the requested payment transaction involving the customer and the corresponding counterparty in accordance with the elements of transaction data 206 and payment data 208. For instance, transaction execution engine 252 may generate a structured message that include selected portions of transaction data 206 and payment data 208, and may perform operations that cause verifier computing system 150 to transmit the structured message across network 120 to one computing systems associated with payment processing network (e.g., a payment rail, etc.), an automated clearinghouse (ACH) network (e.g., a direct deposits of funds into the counterparty account), or a real-time payment (RTP) network (not illustrated in FIG. 3B).

In other examples, confirmation data 318 may indicate that the counterparty account is unavailable to fund, or receive proceeds from, the requested purchase transaction, and executed transaction engine 252 may decline to execute the requested payment transaction involving the counterparty account. In some instances, executed transaction engine 252 may generate an error message indicative of the declined payment transaction (and additionally, or alternatively, the unavailability of the counterparty account), and may perform operations that cause verifier computing system 150 to transmit the error message across network 120 to one or more computing systems or device associated with payment request 204, such as, but not limited to the customer device or the one or more computing systems of the ACH network, the RTP network, or other payment-processing network described herein.

In some instances, the distributed components of distributed computing system 160 may perform any of the exemplary processes described herein to generate elements of encrypted results data 108 that, collectively, establish a linear array $E_S$ of homomorphically encrypted sums associated with each of the plurality of M discrete array partitions, e.g., $E_S=\{E(S_1), E(S_2), E(S_3), \ldots E(S_M)\}$. Based on interactions with one or more of source computing systems 110, such as source computing system 112, the distributed components of distributed computing system 160 may obtain corresponding elements of decrypted results data 312 that establish, collectively, a linear array S of decrypted, partition-specific sums of the residual values associated with corresponding ones of the plurality of M partitions of array $E_U$ and random number RAND. Distributed computing system 160 may perform operations that transmit the elements of decrypted results data 312 (e.g., as portions of verification response 316) across network 120 to verifier computing system 130, which may perform any of the exemplary processes described herein to verify an availability of the counterparty account to fund, or receive proceeds from, requested payment transaction based on the elements of decrypted results data 312.

In other examples, verifier computing system 150 and the distributed components of distributed computing system 160 may perform additional, or alternate, operations that verify the availability of the counterparty account directly and without interaction with one or more of source computing systems 110. For instance, the distributed components of distributed computing system 160 may perform any of the exemplary processes described herein to compute a partition-specific, encrypted residual value for each of the plurality of M discrete array partitions, and further, may transmit the partition-specific, encrypted residual values across network 120 to verifier computing system 150, e.g., using the SSL or TLS protocols described herein. Verifier computing system 150 may perform any of the exemplary process described herein to decrypt the partition-specific, encrypted residual values using homomorphic decryption key 124, and to verify the availability of the counterparty account to fund, or receive proceeds from, the requested payment transaction based on the partition-specific decrypted residual values.

For example, if executed local account verification engine 210 were to determine that at least one of the partition-specific, decrypted residual values were equivalent to zero, then executed local account verification engine 210 may generate elements of confirmation data 318 indicative of the determined unavailability of the counterparty account, and executed transaction engine 252 may perform operations, described herein, to decline to execute the requested payment transaction and generate the error message. Alternatively, if executed local account verification engine 210 were to determine that each of the partition-specific, decrypted residual values is non-zero, equivalent to zero, executed transaction engine 252 may any of the exemplary processes described herein to execute the requested payment transaction involving the customer and the corresponding counterparty in accordance with the elements of transaction data 206 and payment data 208.

In some examples, as described herein, verifier computing system 150 may receive a request to execute a payment transaction initiated by a customer of the verifier financial institution and involving a counterparty account. Based on the received payment request, verifier computing system 150 may perform any of the exemplary processes described herein to generate a request to verify an availability of the counterparty account to fund, or receive proceeds from, the requested payment transaction (e.g., verification request 228 that includes element 226 of encrypted verification data $E(A_{CP}+RAND)$, verification request 304 that includes elements 302 of homomorphically encrypted verification data $E(A_{CP})$ and E(RAND), etc.), and to transmit the verification request across network 120 to distributed computing system 160, e.g., via account verification API 214. The one or more distributed components of distributed computing system 160 may, for example, perform operations on a request-by-request that facilitate a verification of the counterparty account based on privacy-preserving, homomorphic computations involving an array of encrypted account identifiers associated with unavailable accounts and the one or more elements of homomorphically encrypted verification data. The performance of these privacy-preserving homomorphic computations on a request-by request basis at computing system 160 may be computationally inefficient, especially since verifier computation system 150 may receive thousands of unique requests for payment transactions, and may generate and transmit thousands of corresponding verification requests to distributed computing system 160, on a daily basis.

In additional examples, and to reduce a volume of verification requests submitted to account verification API 214 during a particular temporal interval (e.g., on a daily basis), verifier computing system 150 may perform operations that batch each of a plurality of payment requests (e.g., payment request 204, etc.) received during the particular temporal interval, and upon completion of the particular temporal interval, generate a single verification request (e.g., a "batched" verification request) that includes a homomorphically encrypted account identifier representative of each of the counterparty accounts associated with the batched payment requests. Upon submission to account verification API 214 by verifier computing system 150, the distributed components of distributed computing system 160 may perform any exemplary processes described herein to compute encrypted residual values (or encrypted sums of the encrypted residual values and encrypted random numbers), and to obtain decrypted residual values (or decrypted sums), based on not on a single element of encrypted verification data, but on a vector of elements of encrypted verification data. Through a performance of privacy-preserving homomorphic computations on vectors of elements of encrypted verification data, certain of these exemplary processes may reduce a number of computational operations necessary to verify the availability of each of the counterparty accounts (e.g., based on vector processing by the distributed components of distributed computing system 160) when compared to similar processing on a request-by request basis.

Figure 4A:
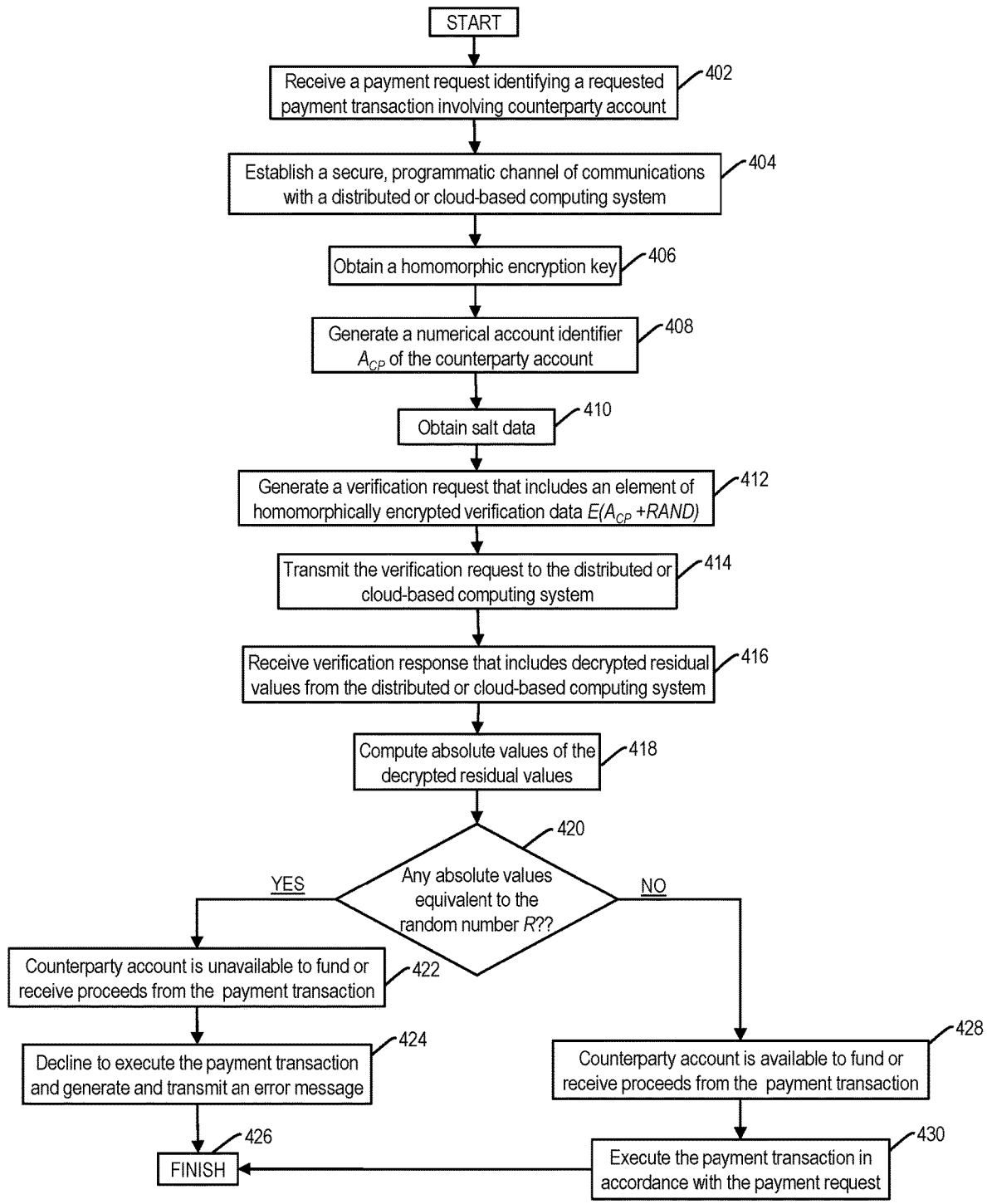
FIGS. 4A, 4B, 5A, and 5B are flowcharts of exemplary processes for validating elements of confidential data using privacy-preserving homomorphic computations on encrypted data, in accordance with some exemplary embodiments.
Figure 4B:
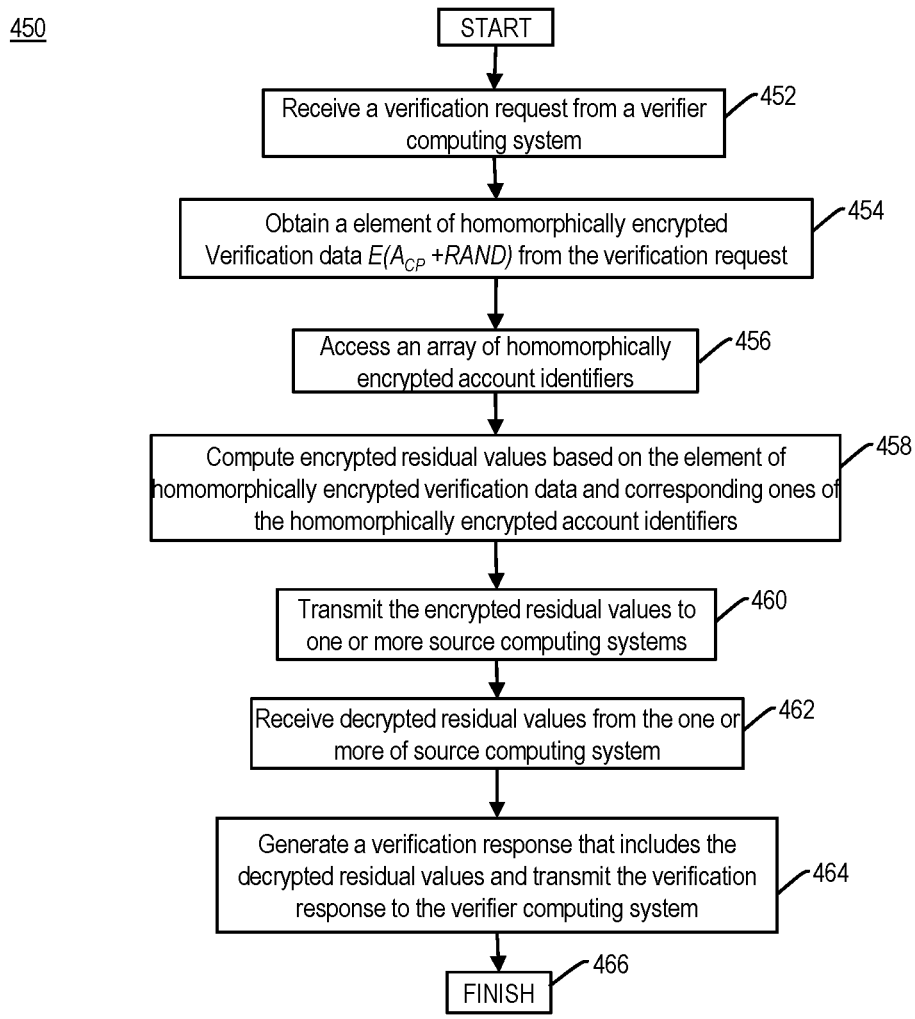

FIGS. 4A and 4B are flowcharts of exemplary processes for validating elements of confidential data using privacy-preserving homomorphic computations on encrypted data, in accordance with the disclosed embodiments. In some instances, one or more computing systems, such as, but not limited to, verifier computing system 150, may perform one or of the steps of exemplary process 400, as described in reference to FIG. 4A, and one or more computing systems, such as, but not limited to, one or more of the distributed components of distributed computing system 160, may perform one or of the steps of exemplary process 450, as described in reference to FIG. 4B.

Referring to FIG. 4A, verifier computing system 150 may receive a request to execute a payment transaction involving a customer of the verifier financial institution and the corresponding counterparty (e.g., in step 402). As described herein, verifier computing system 150 may receive the payment request in step 402 directly from a device operable by the customer (e.g., based on operations performed by a executed application program associated with the verifier financial institution, etc.), or indirectly from one or more computing systems of the ACH network, the RTP network, or other payment-processing network, such as, but not limited to, a clearinghouse system. Further, in some instances, the received payment request may include elements of transaction data and payment data that collectively identify and characterize the initiated payment transaction, the customer and the corresponding counterparty, and the customer and counterparty accounts. For example, the transaction data include values of one or more parameters that characterize the requested payment transaction, such as, but not limited to, a requested payment amount or a requested payment date, and the payment data may include one or more identifiers of the customer and corresponding counterparty, such as, but not limited to, a customer name and a counterparty name, and one or more identifiers of the customer and counterparty accounts, such as, but not limited to, a customer account number and a counterparty account number.

In some instances, verifier computing system 150 may perform any of the exemplary processes described herein to establish a secure, programmatic channel of communication across network 120 with distributed computing system 160 (e.g., in step 404 of FIG. 4A) and to obtain a homomorphic encryption key maintained by the distributed components of distributed computing system 160 (e.g., in step 406 of FIG. 4A). For example, verifier computing system 150 may perform any of the exemplary processes described herein to request, and to receive, the homomorphic encryption key from distributed computing system 160 across the secure, programmatic channel of communications. Further, verifier computing system 150 may also perform any of the exemplary processes described herein to generate a numerical account identifier $A_{CP}$ associated with, and representative of, the counterparty account based on portions of the payment data (e.g., in step 408 of FIG. 4A). The numerical account identifier $A_{CP}$ of the counterparty account characterized by a predetermined format or structure, and examples of the numerical account identifier may include, but are not limited to, all or a portion of an account number of the counterparty account or a numerical character string generated through an application of a hash function to all or selected portion of the name of the counterparty (e.g., a concatenation of the counterparty name) or the account number (e.g., a concatenation of a portion of the counterparty name and the account number).

Verifier computing system 150 may also perform any of the exemplary processes described herein to operation that obtain one or more elements of salt data (e.g., in step 410 of FIG. 4A). As described herein, the one or more elements of salt data may include a random number (e.g., RAND) having a predetermined length, and in some instances, verifier computing system 150 may obtain the elements of salt data from the one or more tangible memories of verifier computing system 150, or may generate random number R, and the elements of the salt data, based on an output of one or more hardware-based random number generation processes or computational, pseudorandom number generation processes.

Further, verifier computing system 150 may perform any of the exemplary processes described herein to compute a sum of numerical counterparty identifier $A_{CP}$ and random number R (e.g., $A_{CP}$+RAND), to encrypt the computed sum using the homomorphic encryption key, and generate a corresponding element of homomorphically encrypted verification data that includes the encrypted sum $E(A_{CP}+$ RAND) (e.g., in step 412 of FIG. 4A). As described herein, verifier computing system 150 may perform operations that package the element of homomorphically encrypted verification data (including the encrypted sum $E(A_{CP}+R)$) into a corresponding portion of a verification request, which verifier computing system 150 may transmit across network 120 to distributed computing system 160 (e.g., in step 414 of FIG. 4A). The transmitted verification request may, for example, represent a request to verify an availability of the counterparty account to fund, or receive proceeds from, the requested payment transaction, and verifier computing system 150 may transmit the verification request to distributed computing system 160 across network 120 via the secure, programmatic communications channel.

Referring to FIG. 4B, the one or more distributed computing components of distributed computing system 160 may receive the verification request from verifier computing system 150 (e.g., in step 452 of FIG. 4B). As described herein, the verification request may include an element of encrypted verification data, such as, but no limited to, an encrypted sum of (i) an numerical account identifier $A_{CP}$ representative of the counterparty account and (ii) a random number RAND having a predetermined structure or format (e.g., $E(A_{CP}+RAND)$), and the one or more distributed components of distributed computing system 160 may parse the verification request and obtain the element of encrypted verification data $E(A_{CP}+R)$ (e.g., in step 454 of FIG. 4B). The one or more of the distributed components of distributed computing system 160 may perform operations that access an array of encrypted account identifiers maintained within an accessible data repository, such as, but not limited to, a data warehouse, data lake, or other centralized data repository established and maintained by distributed computing system 160 (e.g., in step 456 of FIG. 4B).

As described herein, each of the encrypted account identifiers may be representative of an account that is issued by a source financial institution associated with a corresponding one of source computing systems 110 and further, that is unavailable to fund, or receive proceeds from, requested or initiated payment transactions. Examples of the unavailable accounts include, but are not limited to, one or more deposit accounts (e.g., a savings account, a checking account, etc.), a credit-card account, a secured or unsecured line-of-credit, a brokerage account, or an additional financial product issued by corresponding ones of the source financial institution, and as described herein, the unavailable accounts may include, but are not limited to, an account closed or placed on hold by corresponding ones of the customer, an account associated with an actual or suspected instance of fraudulent or malicious activity, an account subject to a judicial, governmental, or regulatory order (e.g., a "frozen" account), or an account associated with one or more impermissible or sanctioned activities.

In some instances, the one or more distributed components of distributed computing system 160 may perform any of the exemplary processes described herein to compute encrypted residual values based on the element of encrypted verification data and corresponding ones of the encrypted account identifiers (e.g., in step 458 of FIG. 4B). By way of example, each of the encrypted residual values may include an encrypted difference between (i) a corresponding one of the three homomorphically encrypted account identifiers within the accessed array and the element of homomorphically encrypted verification data $E(A_{CP}+RAND)$. Further, and as described herein, the encrypted residual values data correspond to, and establish, a linear array $E_R$ of the encrypted residual values, and one or more distributed components of distributed computing system 160 may perform operations that transmit all, or a portion of, the encrypted residual values across network 120 to one, or more, of source computing systems 110, such as source computing system 112 (e.g., in step 460 of FIG. 4B).

For example, and as described herein, source computing system 112 may receive all, or a selected portion, of the encrypted residual values, and may perform any of the exemplary processes to decrypt each of the encrypted residual values (e.g., a corresponding one of the encrypted differences) using a corresponding homomorphic decryption key, and transmit the decrypted residual values, which include corresponding ones of the decrypted differences, across network 120 to distributed computing system 160. Further, additional or alternate ones of source computing systems 110 may perform any of the exemplary processes described herein to decrypt additional, or alternate, encrypted residual values using the corresponding homomorphic decryption key, and to transmit additional, or alternate, decrypted residual values across network 120 to distributed computing system 160.

The distributed components of distributed computing system 160 may receive the decrypted residual values from the one or more of source computing systems 110, including source computing system 112 (e.g., in step 462 of FIG. 4B), and may perform any of the exemplary processes described herein to package the decrypted residual values into corresponding portions of a verification response (e.g., in step 464 of FIG. 4B). In some instances, as described herein, the decrypted residual values may correspond to, and establish, a linear array R of decrypted residual values (e.g., decrypted differences between corresponding ones of the encrypted account identifiers maintained within the accessed array and the element of encrypted verification data $E(A_{CP}+RAND)$ maintained within the verification request), and distributed computing system 160 may perform operations that transmit the elements verification response across network 120 to verifier computing system 150 (e.g., also in step 464 of FIG. 4). For example, in step 464, distributed computing system 160 may transmit the verification response to verifier computing system 150 via the previously established, secure, and programmatic channel of communications, e.g., in accordance with one or more cryptographic protocols, such as, but not limited to, a SSL or TLS protocol. Exemplary process 400 is then complete in step 466.

Referring back to FIG. 4A, verifier computing system 150 may receive the verification response, which includes the decrypted residual values (e.g., in step 416 of FIG. 4A). As described herein, the decrypted residual values my include, or may establish, the array R of decrypted residual values (e.g., the decrypted differences between corresponding ones of the homomorphically encrypted account identifiers and the homomorphically encrypted verification data $E(A_{CP}+RAND)$), and verifier computing system 150 may perform any of the exemplary processes described herein to verify that the counterparty account is available, or alternatively, unavailable, to fund or receive proceeds from the requested payment transaction based on the decrypted residual values. For example, verifier computing system 150 may access each of the decrypted residual values within the verification response (e.g., elements of linear array R of decrypted residual), and may compute an absolute value of each the decrypted differences maintained within the decrypted residual values (e.g., in step 418 of FIG. 4A). Verifier computing system 150 may also perform any of the exemplary processes described herein to determine whether at least one of computed absolute values is equivalent to random number RAND (e.g., in step 420 of FIG. 4A).

If, for example, verifier computing system 150 were to determine that at least one of the computed absolute values is equivalent to random number RAND (e.g., step 420; YES), verifier computing system 150 may establish that the counterparty account is unavailable to fund, or receive proceeds from, the requested payment transaction (e.g., in step 422 of FIG. 4A), and verifier computing system 150 may perform any of the exemplary processes described herein to decline to execute the requested payment transaction and transmit an error message indicative of the declined payment transaction (and additionally, or alternatively, the unavailability of the counterparty account) to one or more computing systems or device associated with the payment request (e.g., in step 424 of FIG. 4A). Exemplary process 400 is then complete in step 262.

Alternatively, if verifier computing system 150 were to determine that none of the computed absolute values are equivalent to random number RAND (e.g., step 420; NO), verifier computing system 150 may establish that the counterparty account is available to fund, or receive proceeds from, the requested payment transaction (e.g., in step 428 of FIG. 4A). Verifier computing system 150 may perform any of the exemplary processes described herein to execute the requested payment transaction in accordance with the payment request (e.g., in step 430 of FIG. 4A), and exemplary process 400 is then complete in step 426.

Figure 5A:
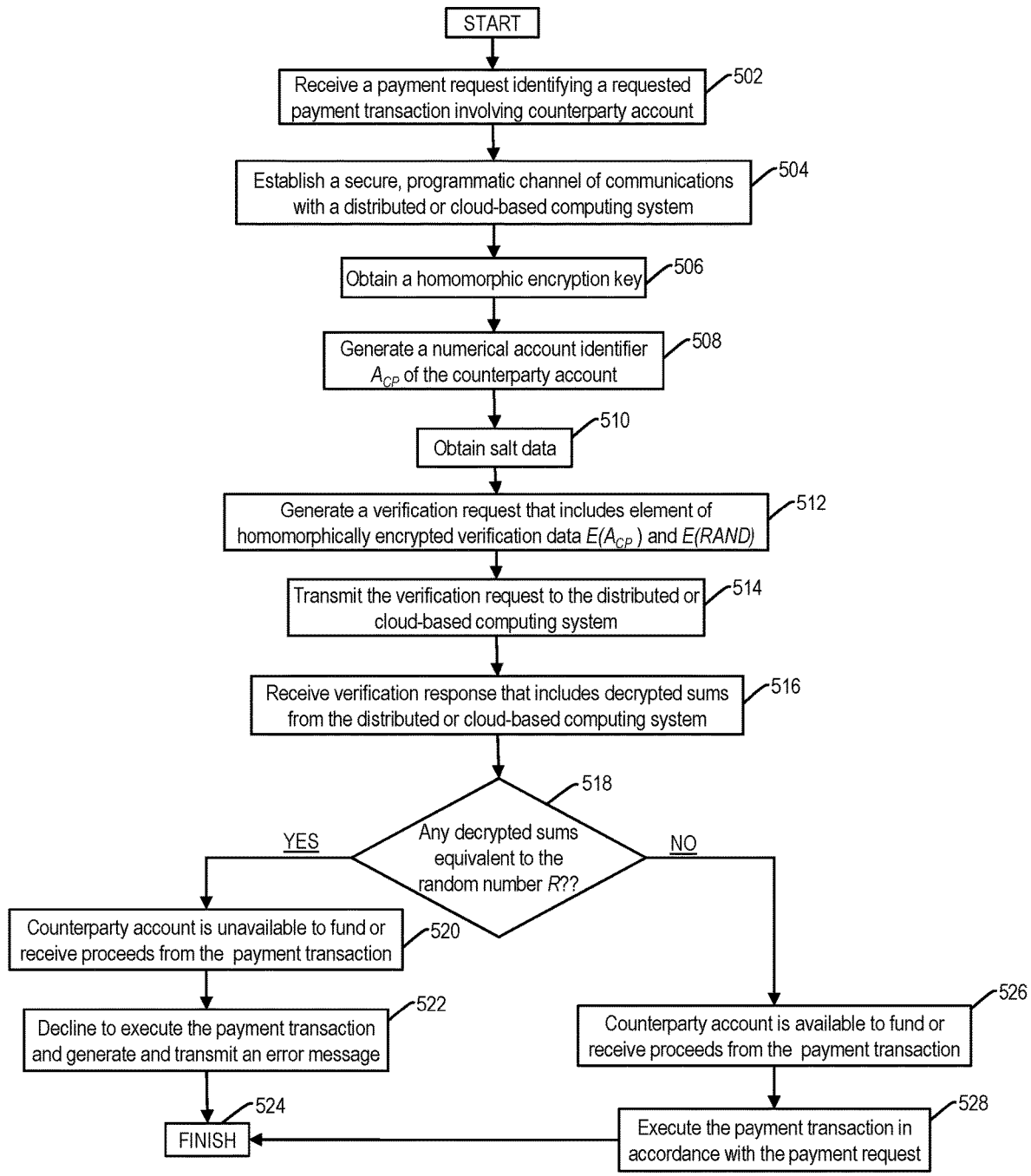
Figure 5B:
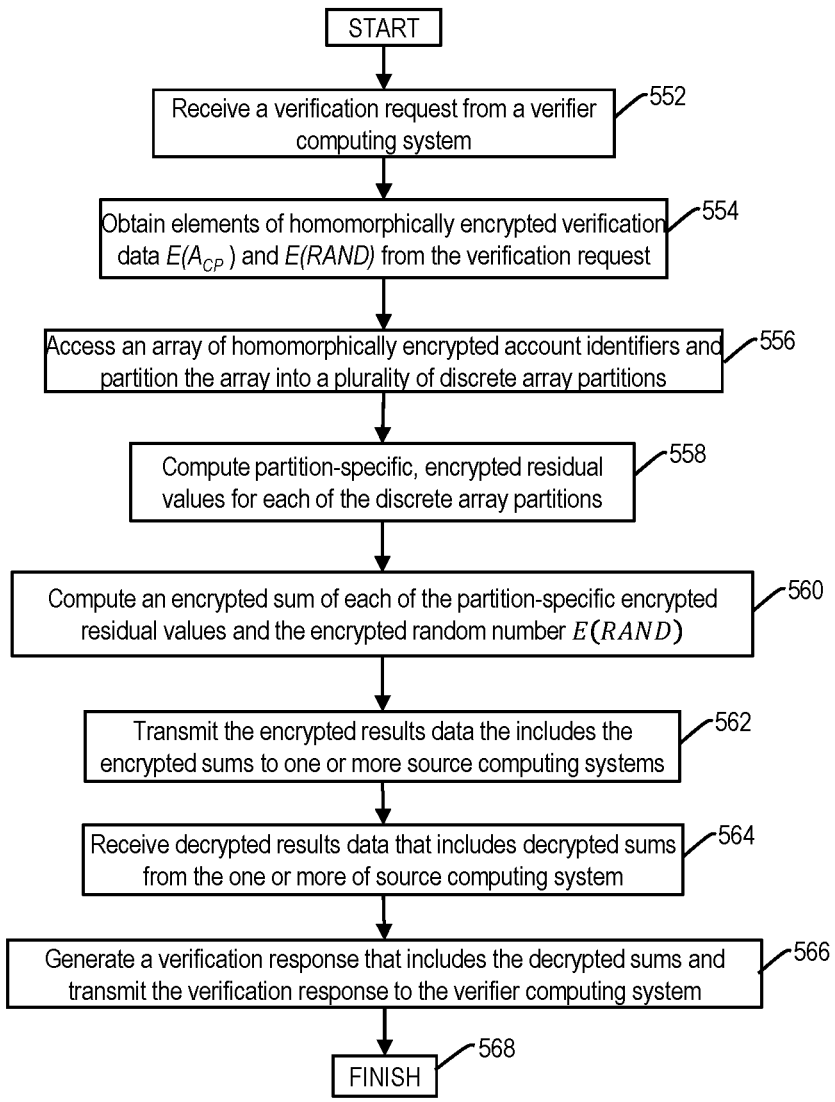

FIGS. 5A and 5B are flowcharts of exemplary processes for validating elements of confidential data using privacy-preserving homomorphic computations on encrypted data, in accordance with the disclosed embodiments. In some instances, one or more computing systems, such as, but not limited to, verifier computing system 150, may perform one or of the steps of exemplary process 500, as described in reference to FIG. 5A, and one or more computing systems, such as, but not limited to, one or more of the distributed components of distributed computing system 160, may perform one or of the steps of exemplary process 550, as described in reference to FIG. 5B.

Referring to FIG. 5A, verifier computing system 150 may receive a request to execute a payment transaction involving a customer of the verifier financial institution of the verifier financial institution and the corresponding counterparty (e.g., in step 502 of FIG. 5A). As described herein, the received payment request may include elements of transaction data and payment data that collectively identify and characterize the initiated payment transaction, the customer and the corresponding counterparty, and the customer and counterparty accounts that, respectively, fund and receive proceed from the initiated payment transaction. For example, the transaction data include values of one or more parameters that characterize the requested payment transaction, such as, but not limited to, a requested payment amount or a requested payment date, and the payment data may include one or more identifiers of the customer and corresponding counterparty, such as, but not limited to, a customer name and a counterparty name, and one or more identifiers of the customer and counterparty accounts, such as, but not limited to, a customer account number and a counterparty account number.

In some instances, verifier computing system 150 may perform any of the exemplary processes described herein to establish a secure, programmatic channel of communication across network 120 with distributed computing system 160 (e.g., in step 504 of FIG. 5A) and to obtain a homomorphic encryption key maintained by the distributed components of distributed computing system 160 (e.g., in step 506 of FIG. 5A). Further, verifier computing system 150 may also perform any of the exemplary processes described herein to generate a numerical account identifier $A_{CP}$ representative of the counterparty account based on portions of the payment data (e.g., in step 508 of FIG. 5A). The numerical account identifier $A_{CP}$ of the counterparty account characterized by a predetermined format or structure, and examples of the numerical counterparty account identifier may include, but are not limited to, all or a portion of an account number of the counterparty account or a numerical character string generated through an application of a hash function to all or selected portion of the name of the counterparty (e.g., a concatenation of the counterparty name) or the account number (e.g., a concatenation of a portion of the counterparty name and the account number).

Verifier computing system 150 may also perform any of the exemplary processes described herein to operation that obtain one or more elements of salt data (e.g., in step 510 of FIG. 5A). As described herein, the one or more elements of salt data may include a random number (e.g., RAND) having a predetermined length, and in some instances, verifier computing system 150 may obtain the elements of salt data from the one or more tangible memories of verifier computing system 150, or may generate random number R, and the elements of the salt data, based on an output of one or more hardware-based random number generation processes or computational, pseudorandom number generation processes.

Further, verifier computing system 150 may perform any of the exemplary processes described herein to encrypt the numerical account identifier $A_{CP}$ and random number RAND using the homomorphic encryption key, and to generate an element of homomorphically encrypted verification data that includes the encrypted numerical account identifier $E(A_{CP})$ and the encrypted random number $E(RAND)$ (e.g., in step 512 of FIG. 5A). As described herein, verifier computing system 150 may perform operations that package the element of encrypted verification data (including the encrypted numerical account identifier $E(A_{CP})$ and the encrypted random number $E(RAND)$) into a corresponding portion of a verification request, which verifier computing system 150 may transmit across network 120 to distributed computing system 160 (e.g., in step 514 of FIG. 5A). The transmitted verification request may, for example, represent a request to verify an availability of the counterparty account to fund, or receive proceeds from, the requested payment transaction, and verifier computing system 150 may transmit the verification request to distributed computing system 160 across network 120 via the secure, programmatic communications channel.

Referring to FIG. 5B, the one or more distributed computing components of distributed computing system 160 may receive the verification request from verifier computing system 150 (e.g., in step 552 of FIG. 5B). As described herein, the verification request may include elements of encrypted verification data, such as, but no limited to, encrypted numerical account identifier $E(A_{CP})$ and the encrypted random number $E(RAND)$, and the one or more distributed components of distributed computing system 160 may parse the verification request and obtain the encrypted numerical account identifier $E(A_{CP})$ and the encrypted random number $E(RAND)$ (e.g., in step 554 of FIG. 5B). Further, one or more distributed components of distributed computing system 160 may access the array of encrypted account identifiers maintained within the data repository (e.g., within encrypted data records 170 of account verification data store 166), and may perform any of the exemplary processes described herein to partition the encrypted account identifiers into a plurality of M discrete array partitions (e.g., in step 556 of FIG. 5B). Each of the plurality of M discrete array partitions may include a subset of the encrypted account identifiers maintained within encrypted data records 170 of account verification data store 166, and in some instances, the one or more distributed components of distributed computing system 160 may partition the array into the plurality of M discrete array partitions, and populate each of the discrete array partitions with the corresponding subset of the encrypted account identifiers, e.g., in accordance with the modulo partitioning process (e.g., $E_U$ mod (N)).

In some instances, the one or more distributed components of distributed computing system 160 may perform any of the exemplary processes described herein to compute, for each of the plurality of M discrete array partitions, a partition-specific encrypted residual value based on the encrypted account identifiers associated with the corresponding one of the discrete array partitions and the encrypted numerical account identifier $E(A_{CP})$ representative of the counterparty account (e.g., in step 558 of FIG. 5B). The one or more distributed components of distributed computing system 160 may also perform any of the exemplary processes described herein to compute an encrypted sum of each of the partition-specific encrypted residual values and the encrypted random number $E(RAND)$ (e.g., in step 560 of FIG. 5B), and to package the encrypted sums into corresponding elements of encrypted results data (e.g., in step 562 of FIG. 5B). In some examples, and as described herein, the elements of encrypted results data correspond to, and establish, a linear array $E_S$ of encrypted sums associated with each of the plurality of M discrete array partitions, and the one or more distributed components of distributed computing system 160 may perform operations that transmit encrypted results data across network 120 to one, or more, of source computing systems 110, such as source computing system 112 (e.g., also in step 562 of FIG. 5B).

For example, and as described herein, source computing system 112 may receive the encrypted results data, and may perform any of the exemplary processes to access the encrypted sum maintained within each of the elements of the encrypted results data, to decrypt each of the encrypted sums using a corresponding homomorphic decryption key, and to package the decrypted sums into corresponding portions of decrypted results data. In some instances, source computing system 112 may transmit the decrypted results data across network 120 to distributed computing system 160. Further, additional or alternate ones of source computing systems 110 may perform any of the exemplary processes described herein to decrypt one or more received elements of encrypted results data using the corresponding homomorphic decryption key, and to transmit the elements of decrypted results data across network 120 to distributed computing system 160.

The distributed components of distributed computing system 160 may receive the elements of decrypted results data from source computing system 112 and additionally, or alternatively, from others of source computing systems 110 (e.g., in step 564 of FIG. 5B). As described herein, the decrypted results data may correspond to, and establish, a linear array S of decrypted sums of corresponding ones of the partition-specific, encrypted residual values and the encrypted random number $E(RAND)$. The distributed components of distributed computing system 160 may perform any of the exemplary processes described herein to package the array S of decrypted sums into corresponding portions of a verification response, and to transmit the elements of decrypted results data to across network 120 to verifier computing system 150 (e.g., in step 566 of FIG. 5B). For example, in step 568, distributed computing system 160 may transmit the verification response to verifier computing system 150 via the previously established, secure, and programmatic channel of communications, e.g., in accordance with one or more cryptographic protocols, such as, but not limited to, a SSL or TLS protocol. Exemplary process 550 is then complete in step 568.

Referring back to FIG. 5A, verifier computing system 150 may receive the verification response, which includes the array S of decrypted sums of corresponding ones of the partition-specific, encrypted residual values and the encrypted random number E(RAND) (e.g., in step 516 of FIG. 5A). In some instances, verifier computing system 150 may perform any of the exemplary processes described herein to verify that the counterparty account is available, or alternatively, unavailable, to fund or receive proceeds from the requested payment transaction based on the decrypted residual values. For example, verifier computing system 150 may access each of the decrypted sums of array S (e.g., as maintained within the verification response) of decrypted sums), and may determine whether at least one of decrypted sums is equivalent to random number R (e.g., in step 518 of FIG. 5A).

If, for example, verifier computing system 150 were to determine that at least one of the decrypted sums is equivalent to random number RAND (e.g., step 518; YES), verifier computing system 150 may establish that the counterparty account is unavailable to fund, or receive proceeds from, the requested payment transaction (e.g., in step 520 of FIG. 5A). Verifier computing system 150 may perform any of the exemplary processes described herein to decline to execute the requested payment transaction and transmit an error message indicative of the declined payment transaction (and additionally, or alternatively, the unavailability of the counterparty account) to one or more computing systems or device associated with the payment request (e.g., in step 522 of FIG. 5A). Exemplary process 500 is then complete in step 524.

Alternatively, if verifier computing system 150 were to determine that none of the decrypted sums are equivalent to random number RAND (e.g., step 518; NO), verifier computing system 150 may establish that the counterparty account is available to fund, or receive proceeds from, the requested payment transaction (e.g., in step 526 of FIG. 5A). Verifier computing system 150 may perform any of the exemplary processes described herein to execute the requested payment transaction in accordance with the payment request (e.g., in step 528 of FIG. 5A). Exemplary process 500 may then pass back to step 524, and exemplary process 500 is complete.

b. Exemplary Computing Architectures

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, pre-processing engine 126, local encryption engine 132, provisioning engine 138, application programming interfaces (APIs) 162, 202, 234, 242, and 248, data ingestion engine 164, local account verification engine 210, pre-processing module 218, encryption module 222, account verification API 214, homomorphic verification engine 216, local decryption engine 236, response engine 244, and transaction engine 252, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU), tensor processing unit (TPU), or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network, such as network 120 described herein.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks, such as network 120, include a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems described herein may perform operations that establish and maintain one or more secure channels of communication across the communications network (e.g., network 120), such as, but not limited to, a transport layer security (TLS) channel, a secure socket layer (SSL) channel, or any other suitable secure communication channel.

The exemplary computing systems or environments described herein can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

What is claimed is:

1. An apparatus, comprising:
 a communications interface;
 a memory storing instructions; and
 at least one processor coupled to the communications interface and the memory, the at least one processor being configured to execute the instructions to:

receive a first encrypted value from a first computing system via the communications interface;
generate encrypted residual values based on encrypted differences between corresponding second encrypted values and the first encrypted value, and receive, via the communications interface, a decrypted residual value associated with each of the encrypted residual values from a second computing system; and
transmit the decrypted residual values to the first computing system via the communications interface, the first computing system being configured to validate first data based on at least the decrypted residual values, and to perform operations associated with the validated first data.

2. The apparatus of claim 1, wherein:
the first encrypted value is representative of the first data; and
the second encrypted values are representative of one or more elements of second data.

3. The apparatus of claim 1, wherein:
the first encrypted value comprises an encrypted sum of the first data and an element of cryptographic data; and
the second encrypted values comprise encrypted elements of second data.

4. The apparatus of claim 3, wherein:
the decrypted residual values comprise decrypted differences between corresponding ones of the second encrypted values and the first encrypted value; and
the first computing system is further configured to execute the instructions to:
compute an absolute value of each of the decrypted residual values; and
validate the first data based on a determination that the each of the computed absolute values fail to be equivalent to the element of cryptographic data.

5. The apparatus of claim 1, wherein:
the first computing system is further configured to encrypt each of the first data and a random number using a homomorphic encryption key;
the first encrypted value comprises the encrypted first data; and
the at least one processor is further configured to execute the instructions to:
receive the first encrypted value and the encrypted random number from the first computing system via the communications interface;
perform additional operations that partition the second encrypted values into a plurality of data partitions, and that associate a subset of the second encrypted values with each of the data partitions; and
for each of the data partitions, generate a corresponding one of the encrypted residual values based on the associated subset of the second encrypted values and the first encrypted value.

6. The apparatus of claim 5, wherein the at least one processor is further configured to execute the instructions to:
compute an encrypted sum of each of the encrypted residual values and the encrypted random number;
receive, via the communications interface, a decrypted sum associated with each of the encrypted sums from the second computing system; and
transmit, via the communications interface, the decrypted sums to the first computing system, the first computing system being further configured to validate the first data based on a determination that the each of the decrypted sums exceeds the random number.

7. The apparatus of claim 1, wherein:
the first computing system is further configured to encrypt the first data using a homomorphic encryption key;
the first encrypted value comprises the encrypted first data; and
the at least one processor is further configured to execute the instructions to transmit the encrypted residual values to the second computing system via the communications interface, the second computing system being configured to decrypt the encrypted residual values using a homomorphic decryption key.

8. The apparatus of claim 1, wherein:
the first data comprises first account data;
the second encrypted values are representative of one or more elements of second account data, the elements of second account data being associated with one or more reference accounts; and
the first computing system is further configured to validate the first account data based on at least the decrypted residual values, and to perform additional operations associated with the validated first account data.

9. The apparatus of claim 8, wherein the additional operations associated with the validated first account data comprise executing a transaction involving the first account data based on the validation of the first account data.

10. The apparatus of claim 1, wherein the at least one processor is further configured to execute the instructions to:
obtain the second encrypted values from a portion of the memory;
compute the encrypted difference between each of second encrypted values and the first encrypted value; and
generate encrypted residual values based on corresponding ones of the encrypted differences.

11. The apparatus of claim 1, wherein the at least one processor is further configured to execute the instructions to:
perform operations that partition the second encrypted values into a plurality of data partitions, and that associate a subset of the second encrypted values with each of the data partitions; and
for each of the data partitions, generate a corresponding one of the encrypted residual values based on the associated subset of the second encrypted values and the first encrypted value.

12. A computer-implemented method, comprising:
receiving a first encrypted value from a first computing system using at least one processor;
using the at least one processor, generating encrypted residual values based on encrypted differences between corresponding second encrypted values and the first encrypted value, and receiving a decrypted residual value associated with each of the encrypted residual values from a second computing system; and
transmitting the decrypted residual values to the first computing system using the at least one processor, the first computing system being configured to validate first data based on at least the decrypted residual values, and to perform operations associated with the validated first data.

13. An apparatus, comprising:
a communications interface;
a memory storing instructions; and
at least one processor coupled to the communications interface and the memory, the at least one processor being configured to execute the instructions to:
transmit a first encrypted value to a first computing system via the communications interface, the first computing system being configured to:

generate encrypted residual values based on encrypted differences between corresponding second encrypted values and the first encrypted value; and obtain a decrypted residual value associated with each of the encrypted residual values from a second computing system;

receive the decrypted residual values from the first computing system via the communications interface; and validate first data based on at least the decrypted residual values, and perform operations associated with the validated first data.

14. The apparatus of claim 13, wherein:

the first encrypted value is representative of the first data; and the second encrypted values are representative of one or more elements of second data.

15. The apparatus of claim 13, wherein:

the first encrypted value comprises an encrypted sum of the first data and an element of cryptographic data; and the second encrypted values comprise encrypted elements of second data; and the at least one processor is further configured to execute the instructions to:

compute an absolute value of each of the decrypted residual values; and validate the first data based on a determination that the each of the computed absolute values fails to be equivalent to the element of cryptographic data.

16. The apparatus of claim 15, wherein the at least one processor is further configured to execute the instructions to:

compute a sum of the first data and the element of cryptographic data;

encrypt the computed sum using a homomorphic encryption key; and generate the first encrypted value based on the encrypted sum.

17. The apparatus of claim 15, wherein the element of cryptographic data comprises a random number.

18. The apparatus of claim 13, wherein;

the first computing system is further configured to access the second encrypted values, compute the encrypted differences between corresponding ones of the second encrypted values and the first encrypted value, and generate each of the encrypted residual values based on a corresponding one of the encrypted differences; and the second computing system is configured to decrypt each of the encrypted residual values using a homomorphic decryption key.

19. The apparatus of claim 13, wherein:

the first data comprises first account data;

the second encrypted values are representative of one or more elements of second account data, the elements of second account data being associated with one or more reference accounts; and the at least one processor is further configured to execute the instructions to validate the first account data based on at least the decrypted residual values, and to perform additional operations associated with the validated first account data.

20. The apparatus of claim 19, wherein the at least one processor is further configured to execute the instructions to:

receive, via the communications interface, a request to execute a transaction, the request comprising at least a portion of the first account data; and generate the first encrypted value based on the received request, the first encrypted value being representative of the first account data.

21. The apparatus of claim 20, wherein the at least one processor is further configured to execute the instructions to, based on the validation of the first account data, execute the requested transaction in accordance with the portion of the first account data.

* * * * *